US011235453B2

(12) United States Patent
Ichikawa et al.

(10) Patent No.: US 11,235,453 B2
(45) Date of Patent: Feb. 1, 2022

(54) ELECTRIC WORKING MACHINE AND METHOD OF CONTROLLING ROTATIONAL STATE OF MOTOR OF ELECTRIC WORKING MACHINE

(71) Applicant: MAKITA CORPORATION, Anjo (JP)

(72) Inventors: Yoshitaka Ichikawa, Anjo (JP); Goshi Ishikawa, Anjo (JP); Shinichi Hira, Anjo (JP); Yasuhito Kawai, Anjo (JP); Masahiro Watanabe, Anjo (JP); Takuya Kusakawa, Anjo (JP)

(73) Assignee: MAKITA CORPORATION, Anjo (JP)

( * ) Notice: Subject to any disclaimer, the term of this patent is extended or adjusted under 35 U.S.C. 154(b) by 269 days.

(21) Appl. No.: 16/052,747

(22) Filed: Aug. 2, 2018

(65) Prior Publication Data

US 2019/0047131 A1 Feb. 14, 2019

(30) Foreign Application Priority Data

Aug. 9, 2017 (JP) .............................. JP2017-154192

(51) Int. Cl.
*B25F 5/00* (2006.01)
*B25B 21/00* (2006.01)
(Continued)

(52) U.S. Cl.
CPC ............ *B25F 5/001* (2013.01); *B25B 21/008* (2013.01); *B25B 21/02* (2013.01);
(Continued)

(58) Field of Classification Search
CPC ....... B25F 5/001; B25B 21/008; B25B 21/02; B25B 23/1475; H02P 29/40; H02P 6/08; H02P 27/04
See application file for complete search history.

(56) References Cited

U.S. PATENT DOCUMENTS 6,687,567 B2 * 2/2004 Watanabe ........... B25B 23/1405
173/11
7,419,013 B2 * 9/2008 Sainomoto .......... B25B 23/1405
173/181
(Continued)

FOREIGN PATENT DOCUMENTS

CN 1607075 A 4/2005
CN 1695899 A 11/2005
(Continued)

OTHER PUBLICATIONS

Mar. 5, 2020 Office Action issued in U.S. Appl. No. 16/056,717.
(Continued)

*Primary Examiner* — Thanh K Truong
*Assistant Examiner* — Scott A Howell
(74) *Attorney, Agent, or Firm* — Oliff PLC

(57) ABSTRACT

An electric working machine in one aspect of the present disclosure includes a motor, a controller, and a setter. The controller is configured to change a rotational state of the motor, in response to an establishment of a condition for change after the motor is initiated, from a low speed rotation to a high speed rotation. The setter is configured to set, based on a situation in the motor in the low speed rotation, a control variable of the motor in the high speed rotation and/or the condition for change.

17 Claims, 26 Drawing Sheets

(51) Int. Cl.
*H02P 6/08* (2016.01)
*B25B 23/147* (2006.01)
*H02P 29/40* (2016.01)
*B25B 21/02* (2006.01)
*H02P 27/04* (2016.01)

(52) U.S. Cl.
CPC ............ *B25B 23/1475* (2013.01); *H02P 6/08* (2013.01); *H02P 29/40* (2016.02); *H02P 27/04* (2013.01)

(56) References Cited

U.S. PATENT DOCUMENTS

| | | | |
|---|---|---|---|
| 7,516,801 B2 | 4/2009 | Meixner et al. | |
| 7,806,198 B2 | 10/2010 | Puzio | |
| 8,179,069 B2* | 5/2012 | Matsunaga | H02P 6/08 318/434 |
| 8,584,770 B2 | 11/2013 | Zhang et al. | |
| 8,674,640 B2* | 3/2014 | Suda | B25D 16/003 318/430 |
| 8,678,106 B2* | 3/2014 | Matsunaga | B25B 21/008 173/176 |
| 8,794,348 B2 | 8/2014 | Rudolph et al. | |
| 8,890,449 B2* | 11/2014 | Suzuki | B25F 5/00 173/15 |
| 8,919,456 B2 | 12/2014 | Ng et al. | |
| 8,981,680 B2* | 3/2015 | Suda | B25F 5/021 315/314 |
| 9,379,560 B2* | 6/2016 | Brandner | G01R 19/0092 |
| 9,579,776 B2 | 2/2017 | Arimura et al. | |
| 10,343,268 B2* | 7/2019 | Hirabayashi | B25B 21/02 |
| 2005/0109519 A1 | 5/2005 | Kawai et al. | |
| 2005/0263303 A1* | 12/2005 | Shimizu | B25B 23/1475 173/2 |
| 2005/0263305 A1* | 12/2005 | Shimizu | B25B 23/1405 173/2 |
| 2006/0185869 A1* | 8/2006 | Arimura | B25B 23/1475 173/176 |
| 2007/0000676 A1* | 1/2007 | Arimura | B25B 23/1475 173/179 |
| 2011/0152029 A1 | 6/2011 | Rudolph et al. | |
| 2011/0284256 A1 | 11/2011 | Iwata | |
| 2013/0133911 A1* | 5/2013 | Ishikawa | B25B 21/00 173/176 |
| 2014/0232352 A1* | 8/2014 | Brandner | B25F 5/00 320/136 |
| 2015/0047866 A1* | 2/2015 | Sakai | B25F 5/00 173/179 |
| 2015/0231770 A1* | 8/2015 | Kusakawa | B25B 23/1475 173/93.5 |
| 2016/0107297 A1* | 4/2016 | Ishikawa | B25B 23/18 173/179 |
| 2016/0121467 A1 | 5/2016 | Ng et al. | |
| 2016/0129576 A1* | 5/2016 | Nishikawa | B25D 17/11 173/2 |
| 2016/0151845 A1 | 6/2016 | Yamamoto et al. | |
| 2016/0250743 A1 | 9/2016 | Kikuchi et al. | |

FOREIGN PATENT DOCUMENTS

| | | |
|---|---|---|
| CN | 102248522 A | 11/2011 |
| CN | 105522520 A | 4/2016 |
| CN | 106998168 A | 8/2017 |
| JP | 2005-324264 A | 11/2005 |
| JP | 2011-240441 A | 12/2011 |
| JP | 2013-226626 A | 11/2013 |
| JP | 2015-024512 A | 2/2015 |
| JP | 2015037822 A | 2/2015 |
| JP | 2015-188981 A | 11/2015 |
| JP | 2016-078230 A | 5/2016 |
| JP | 2016-135108 A | 7/2016 |

OTHER PUBLICATIONS

Sep. 28, 2020 Office Action issued in Chinese Patent Application No. 201810884572.9.
Sep. 18, 2020 Office Action issued U.S. Appl. No. 16/056,717.
Dec. 8, 2020 Office Action issued in U.S. Appl. No. 16/056,717.
Feb. 24, 2021 Office Action issued in Japanese Patent Application No. 2017-154191.
Mar. 2, 2021 Office Action issued in Japanese Patent Application No. 2017-154192.
May 7, 2021 Office Action issued in Chinese Patent Application No. 201810884572.9.
May 26, 2021 Office Action issued in U.S. Appl. No. 16/056,717.

* cited by examiner

| SCREW | LOW SPEED SETTING | HIGH SPEED SETTING | CHANGE RATE SETTING |
|---|---|---|---|
| SCWa | 1ST LOW SPEED MODE | 1ST HIGH SPEED MODE | 1ST SLOPE A |
| | | | 2ND SLOPE B |
| SCWb | 1ST LOW SPEED MODE | 2ND HIGH SPEED MODE | 1ST SLOPE A |
| | | | 2ND SLOPE B |
| SCWc | 1ST LOW SPEED MODE | 3RD HIGH SPEED MODE | 1ST SLOPE A |
| | | | 2ND SLOPE B |
| SCWd | 2ND LOW SPEED MODE | 1ST HIGH SPEED MODE | 1ST SLOPE A |
| | | | 2ND SLOPE B |
| SCWe | 2ND LOW SPEED MODE | 2ND HIGH SPEED MODE | 1ST SLOPE A |
| | | | 2ND SLOPE B |
| SCWf | 2ND LOW SPEED MODE | 3RD HIGH SPEED MODE | 1ST SLOPE A |
| | | | 2ND SLOPE B |
| SCWg | 3RD LOW SPEED MODE | 1ST HIGH SPEED MODE | 1ST SLOPE A |
| | | | 2ND SLOPE B |
| SCWh | 3RD LOW SPEED MODE | 2ND HIGH SPEED MODE | 1ST SLOPE A |
| | | | 2ND SLOPE B |
| SCWi | 3RD LOW SPEED MODE | 3RD HIGH SPEED MODE | 1ST SLOPE A |
| | | | 2ND SLOPE B |

FIG. 5

ELECTRIC WORKING MACHINE AND METHOD OF CONTROLLING ROTATIONAL STATE OF MOTOR OF ELECTRIC WORKING MACHINE

CROSS-REFERENCE TO RELATED APPLICATIONS

This application claims the benefit of Japanese Patent Application No. 2017-154192 filed Aug. 9, 2017 in the Japan Patent Office, the disclosure of which is incorporated herein by reference.

BACKGROUND

The present disclosure relates to an electric working machine that is configured to change a rotational state of a motor from a low speed rotation to a high speed rotation in response to an establishment of a condition for change.

A rotary impact tool disclosed in Japanese Unexamined Patent Application Publication No. 2016-078230 is configured to rotate a motor in a low speed at the initiation of the drive of the motor. After a given number of impact, the rotary impact tool determines that a condition for change is established and changes the rotational state of the motor from the low speed rotation to the high speed rotation.

SUMMARY

In the aforementioned rotary impact tool, the number of impact to establish the condition for change is preset. A control variable of the motor in the high speed rotation, such as a target rotational frequency in a feedback control and a duty ratio in an open loop control, for example, are primarily set in accordance with an amount of manipulation on a trigger by a user.

In other words, in the aforementioned rotary impact tool, it has been unable to set the aforementioned condition for change and the control variable of the motor in the high speed rotation in accordance with a situation in the motor.

The number of impact necessary to drive a tip of a fastener, such as a screw, into a workpiece, such as a board, to some extent may be increased when a load imposed on the motor in the low speed rotation is large. Preferably, in such a case, the number of impact that is the condition for change can be set to a greater number than ordinary cases, and the rotational frequency in the high speed rotation can be set greater than ordinary cases. However, the problem is that such setting cannot be achieved in the aforementioned rotary impact tool.

This problem can be seen not only in the aforementioned rotary impact tool but also in any electric working machines that are configured to change the rotational state of the motor from the low speed rotation to the high speed rotation in response to an establishment of a specified condition for change, such as an increase of the load after the motor is initiated.

Desirably, one aspect of the present disclosure can set, in accordance with a situation in the motor, a control variable of a motor of an electric working machine in a high speed rotation and/or a condition for change to change a rotational state of the motor from a low speed rotation to a high speed rotation.

An electric working machine in one aspect of the present disclosure includes a motor, a controller, and a setter.

The controller is configured to initiate the motor at a preset low speed rotation. The controller is further configured to change a rotational state of the motor, in response to an establishment of a condition for change after the motor is initiated, from the low speed rotation to a high speed rotation. The high speed rotation is greater than the low speed rotation in rotational frequency of the motor.

The setter is configured to set, based on a situation in the motor in the low speed rotation, a control variable of the motor in the high speed rotation and/or the condition for change.

According to the electric working machine configured as described above, the rotational state of the motor can be changed from the low speed rotation to the high speed rotation in response to the establishment of the condition for change. Additionally, in this electric working machine, the control variable of the motor in the high speed rotation can be optimally set in accordance with the situation in the motor in the low speed rotation.

As a result, according to this electric working machine, a user of this electric working machine can appropriately perform his/her work (for example, fastening of a screw) on a fastener without manually adjusting a timing to change the rotational state of the motor from the low speed rotation to the high speed rotation and/or the drive state of the motor in the high speed rotation.

Due to the aforementioned reason, this electric working machine is improved in usability compared with conventional electric working machines, and therefore, can be improved in work efficiency.

The setter may be configured to set a target value of the control variable (for example, command rotational frequency and command torque).

In this case, the setter may be configured to set the target value in accordance with a magnitude of a load imposed on the motor in the low speed rotation.

The setter may further be configured to set the target value such that the target value increases in response to the magnitude of the load being greater than a preset load threshold value.

The setter may be configured to set a conduction parameter of the motor (for example, a value of conduction current and a drive duty ratio) as the control variable. The conduction parameter may correspond to a magnitude of current supplied to the motor.

The setter may be configured to set the conduction parameter such that the conduction parameter increases in response to the magnitude of the load being greater than a preset load threshold value.

In this case, the motor can be driven such that the rotational frequency of the motor or a rotation torque in the high speed rotation increases as the magnitude of the load imposed on the motor in the low speed rotation increases. Consequently, the user can efficiently perform the work on the fastener.

The conduction parameter may correspond to a duty ratio for a pulse width modulation control of a magnitude of the current.

The setter may be configured to set the condition for change in accordance with the magnitude of the load imposed on the motor in the low speed rotation.

In this case, the setter can adjust a duration of time before changing the rotational state of the motor from the low speed rotation to the high speed rotation in accordance with the magnitude of the load imposed on the motor in the low speed rotation.

The aforementioned electric working machine may further include an impact mechanism, and an impact detector configured to detect an impact by the impact mechanism.

In this case, the condition for change may be established in response to the number of the impact detected by the impact detector reaching a given number in the low speed rotation.

In this case, the controller can change the rotational state of the motor from the low speed rotation to the high speed rotation in response to the number of the impact reaching the given number.

The setter may be configured to set the given number in accordance with the magnitude of the load imposed on the motor in the low speed rotation.

The setter may be configured to set the given number such that the given number increases in response to the magnitude of the load being greater than the load threshold value.

The controller may be configured to accumulate a length of time when a magnitude of conduction current to the motor in the low speed rotation is equal to or greater than a preset electric current threshold value.

In this case, the condition for change may be established in response to the accumulated length of time reaching a given length of time.

The setter may be configured to set the given length of time in accordance with the magnitude of the load imposed on the motor in the low speed rotation.

The setter may be configured to set the given length of time such that the given length of time increases in response to the magnitude of the load being greater than the load threshold value.

In a case where the given number or the given length of time is set in accordance with the magnitude of the load imposed on the motor in the low speed rotation, the duration of time before changing the rotational state of the motor from the low speed rotation to the high speed rotation can be set longer as the magnitude of the load is greater in the low speed rotation.

In this case, the user can still perform the work on the fastener sufficiently in the low speed rotation before initiating the work on the fastener in the high speed rotation even when the magnitude of the load is large.

More specifically, the tip of the screw is driven into the workpiece to some extent before the rotational state of the motor is changed from the low speed rotation to the high speed rotation. This can reduce falling of the screw and an occurrence of come-out after the rotational state of the motor is changed to the high speed rotation. Consequently, the work efficiency of fastening the fastener can be improved.

In the present disclosure, the rotational frequency of the motor corresponds to the number of rotation of the motor per unit time or rotational speed of the motor. In addition, the aforementioned come-out means an event that a tool bit that is driven by the rotation of the motor leaves the cross recess of the screw and is disengaged from the screw.

Another aspect of the present disclosure is a method of controlling a rotational state of a motor of an electric working machine.

The method includes initiating the motor at a preset low speed rotation.

The method also includes setting a control variable and/or a condition for change based on a situation in the motor in the low speed rotation. The control variable is a parameter to control the rotational state of the motor at a high speed rotation. The condition for change is a condition to change the rotational state of the motor from the low speed rotation to the high speed rotation. The high speed rotation is greater than the low speed rotation in rotational frequency of the motor.

The method also includes changing the rotational state of the motor from the low speed rotation to the high speed rotation in response to an establishment of the condition for change after the motor is initiated.

According to such a method, the control variable of the motor in the high speed rotation and/or the condition for change can be set in accordance with the situation in the motor of the electric working machine.

BRIEF DESCRIPTION OF THE DRAWINGS

An example embodiment of the present disclosure will be described hereinafter with reference to the accompanying drawings, in which:

FIG. 5 is an explanatory diagram showing control patterns of rotational frequency of a motor in a speed-change mode, which is set in an input process of an impact force change SW shown in FIG. 4;

DETAILED DESCRIPTION OF THE PREFERRED EMBODIMENTS

In the present embodiment, rechargeable impact driver 1 (hereinafter also simply called "driver 1") will be explained as one example of an electric working machine in the present disclosure.

Figure 1:
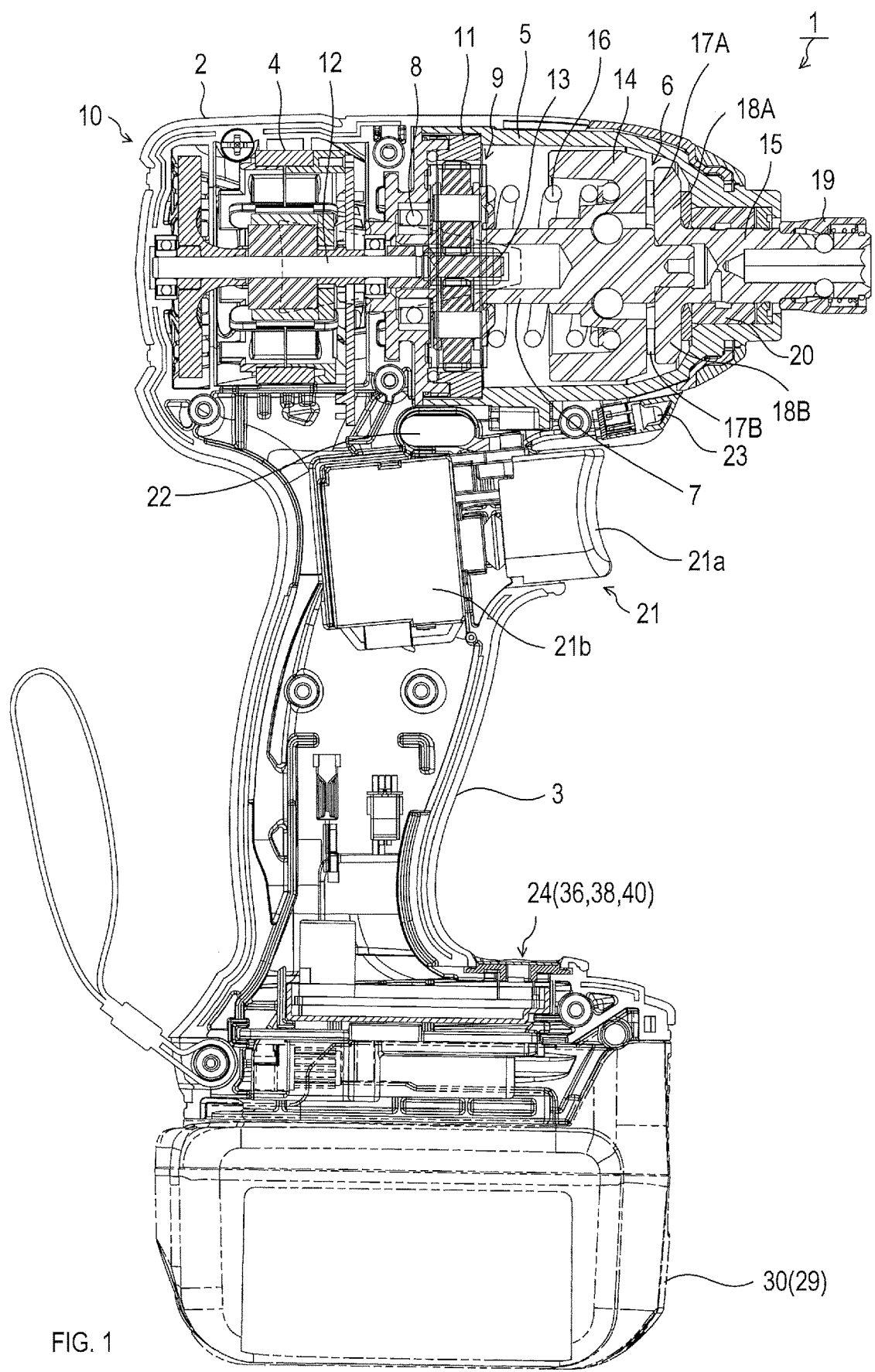
FIG. 1 is a vertical sectional view of a rechargeable impact driver in an embodiment.

FIG. 1 shows that the driver 1 includes a tool main body 10, and a battery pack 30 configured to supply an electric power to the tool main body 10.

The tool main body 10 includes a housing 2 configured to house components such as a motor 4 and an impact mechanism 6, and a grip 3 formed to protrude downwardly (towards the downward direction of FIG. 1) from a lower portion of the housing 2.

The housing 2 houses the motor 4 in its rear area (left side area in FIG. 1). A bell-shaped hammer casing 5 is assembled in a front area of the housing 2 in front of the motor 4 (right side area in FIG. 1). The impact mechanism 6 is housed in this hammer casing 5.

The hammer casing 5 coaxially houses a spindle 7. The spindle 7 includes a hollow space in its rear end area. An outer periphery of the rear end area of the spindle 7 is rotatably supported by a ball bearing 8 that is arranged in a rear end area of the hammer casing 5.

The hammer casing 5 also houses a planetary gear mechanism 9 including two planetary gears that are rotatably supported and arranged point symmetrically about the rotational axis of the spindle 7. The planetary gear mechanism 9 is situated in a front side of the ball bearing 8. The planetary gear mechanism 9 meshes with an internal gear 11 that is arranged on an inner circumferential surface at the rear side of the hammer casing 5.

The planetary gear mechanism 9 is configured to mesh with a pinion 13 that is arranged at a front end of an output shaft 12 of the motor 4.

The impact mechanism 6 includes the spindle 7, a hammer 14 arranged around the spindle 7, an anvil 15 that is rotatably supported in a front side of the hammer 14, and a coil spring 16 configured to bias the hammer 14 towards the front.

Specifically, the hammer 14 is coupled to the spindle 7 so as to be rotatable together with the spindle 7 and movable along the rotational axis. The hammer 14 is biased towards the front (towards the anvil 15) by the coil spring 16.

A front end of the spindle 7 is rotatably supported by loosely and coaxially inserted in a rear end of the anvil 15.

The anvil 15 is configured to rotate about the rotational axis due to a rotational force and an impact force by the hammer 14. The anvil 15 is supported by a bearing 20, which is arranged in a front end of the housing 2, so as to be freely rotatable about the rotational axis but not to be movable along the rotational axis.

A chuck sleeve 19 is arranged in a front end of the anvil 15 for attachment of various tool bits (omitted in drawings) such as a driver bit and a socket bit.

The output shaft 12 of the motor 4, the spindle 7, the hammer 14, the anvil 15, and the chuck sleeve 19 are all arranged coaxially with each other.

On a front end surface of the hammer 14, a first and second impact protrusions 17A and 17B that are configured to apply the impact force to the anvil 15 are arranged at 180° intervals with each other in a circumferential direction.

On the rear end of the anvil 15, a first and second impact arms 18A and 18B that are configured to be abuttable respectively against the first and second impact protrusions 17A and 17B of the hammer 14 are arranged at 180° intervals with each other in the circumferential direction.

The first and second impact protrusions 17A and 17B are caused to abut respectively against the first and second impact arms 18A and 18B in response to the hammer 14 being biased and retained in the front end area of the spindle 7 due to a biasing force of the coil spring 16.

If, in this biased state, the spindle 7 rotates via the planetary gear mechanism 9 due to the rotational force of the motor 4, then the hammer 14 rotates together with the spindle 7, which transmits the rotational force of the hammer 14 to the anvil 15 through the first impact protrusion 17A, the second impact protrusion 17B, the first impact arm 18A, and the second impact arm 18B.

This consequently causes the tool bit, such as a driver bit, attached to a tip of the anvil 15 to rotate and enables screw fastening.

If the anvil 15 receives an external torque equal to or greater than a specified value due to the screw being fastened to a predefined position, then the rotational force (torque) of the hammer 14 on the anvil 15 also becomes equal to or greater than a specified value.

As a consequence, the hammer 14 moves towards the rear against the biasing force of the coil spring 16, which causes the first and second impact protrusions 17A and 17B to climb respectively over the first and second impact arms 18A and 18B. In other words, the impact protrusions 17A and 17B temporarily disengage from the respective first and second impact arms 18A and 18B respectively, and thus the hammer 14 idles.

The idling hammer 14 moves forward again due to the biasing force of the coil spring 16 while rotating the spindle 7. As a result, the first and second impact protrusions 17A and 17B provide an impact against the respective first and second impact arms 18A and 18B in the rotational direction.

Accordingly, in the driver 1, every time the anvil 15 receives a torque equal to or greater than the specified value, the anvil 15 receives an impact repeatedly by the hammer 14. Such intermittent application of the impact force of the hammer 14 to the anvil 15 enables a screw fastening at a high torque.

The grip 3 is configured to be held by an operator. The grip 3 includes a trigger 21 in its upper area.

The trigger 21 includes a manipulation device 21a configured to be pulled by the operator, and a detector 21b configured to detect an operation state of the manipulation device 21a.

Above the trigger 21 (in a lower end area of the housing 2), a rotational direction switch (SW) 22 is provided to be used to change the rotational direction of the motor 4 to either a normal direction or a reverse direction. In the present embodiment, the normal direction of the motor 4 is the clockwise direction when viewing the driver 1 from the rear to the front; thus the counterclockwise direction is the reverse direction of the motor 4.

The housing 2 also includes, in its lower front end, an illuminator 23 including an LED and configured to illuminate ahead of the driver 1 with the LED in response to a pulling manipulation on the trigger 21.

A display panel 24 is located in a lower front area of the grip 3. The display panel 24 is configured to display information such as remaining energy in a battery 29 in the battery pack 30 and an operation mode of the driver 1.

In addition, a mode change SW 36, an impact force change SW 38, an illuminating SW 40 (see FIG. 2) are arranged near the display panel 24.

The mode change SW 36 is provided to change the operation mode of the driver 1 to either (i) a normal mode to control the rotation of the motor 4 in accordance with an amount of manipulation on the trigger 21 or (ii) a speed-change mode to change the rotational state of the motor 4 between a low speed rotation and a high speed rotation.

The mode change SW 36 is configured to be placed in the ON state when manipulated (pressed) by the user. The operation mode of the driver 1 is changed to and from the normal mode and the speed-change mode alternately every time the mode change SW 36 is placed in the ON state.

The impact force change SW 38 is provided to change the impact force by selecting, from a predefined control patterns, a control pattern to set the rotational frequency for a low speed rotation and a high speed rotation in the speed-change mode, and a change rate (amount of change per unit time) of the rotational frequency when changing from the low speed rotation to the high speed rotation.

The illuminating SW 40 is provided to turn the illuminator 23 ON or OFF when the trigger 21 is manipulated.

The battery pack 30 housing the battery 29 is detachably attached to a lower end of the grip 3. The battery pack 30 is attached by sliding against the lower end of the grip 3 from the front side to the rear side of the grip 3.

In the present embodiment, the battery 29 housed in the battery pack 30 is a rechargeable battery, for example, a lithium ion battery.

In the present embodiment, the motor 4 is implemented with a three-phase brushless motor including armature windings (hereinafter referred to as "phase windings") each corresponding respectively to U, V, and W phases.

Figure 2:
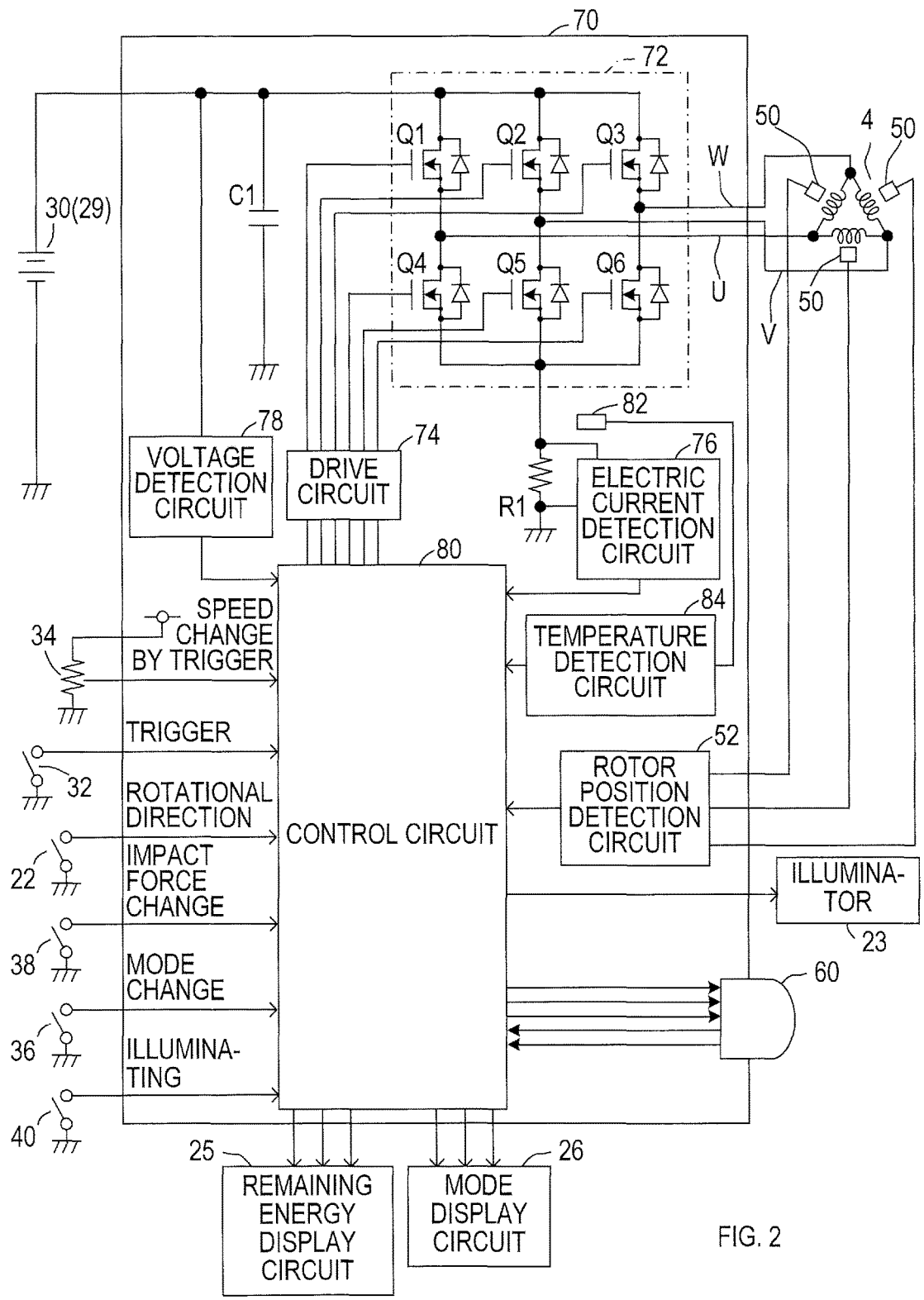
FIG. 2 is a block diagram showing an electrical configuration of a motor driver mounted in the rechargeable impact driver.

FIG. 2 shows a motor driver 70 arranged inside the grip 3. The motor driver 70 is configured to drive control the motor 4 with the electric power supplied from the battery pack 30.

The motor driver 70 includes a bridge circuit 72, a drive circuit 74, and a control circuit 80.

The bridge circuit 72 is configured to receive the electric power from the battery pack 30 and supply a current to each phase windings in the motor 4. More specifically, the bridge circuit 72 in the present embodiment is a three-phase full bridge circuit including six switching elements Q1 to Q6. In the present embodiment, each of the switching elements Q1 to Q6 is implemented with, but not limited to, a metal-oxide-semiconductor field-effect transistor (MOSFET).

In the bridge circuit 72, the switching elements Q1, Q2, and Q3 are so-called high-side switches and arranged between respective terminals U, V, and W of the motor 4 and a power-supply line, which is coupled to the positive electrode of the battery 29.

Other switching elements Q4, Q5, and Q6 are so-called low-side switches and arranged between the respective terminals U, V, and W of the motor 4 and a ground line, which is coupled to the negative electrode of the battery 29.

In a power-supply path from the battery pack 30 to the bridge circuit 72, a capacitor C1 is provided to reduce variation of a voltage of the battery 29 (hereinafter referred to as "battery voltage").

The drive circuit 74 is configured to supply current to each phase winding in the motor 4 to rotate the motor 4 by turning ON/OFF each of the switching elements Q1 to Q6 in accordance with control signals transmitted from the control circuit 80.

The control circuit 80 includes a Micro Controller Unit (MCU) including a CPU, a ROM, and a RAM. The control circuit 80 is configured to rotate the motor 4 by turning ON/OFF the switching elements Q1 to Q6 to control current supplied to each phase windings in the motor 4. In replacement of or in addition to the MCU, the control circuit 80 may include a combination of electronic components such as discrete elements, an Application Specified Integrated Circuit (ASIC), an Application Specific Standard Product (ASSP), a programmable logic device such as a Field Programmable Gate Array (FPGA), or a combination of these.

The control circuit 80 operates by a power-supply voltage (direct current (DC) constant voltage) generated in a regulator (not shown) in the motor driver 70.

The regulator is configured to receive the electric power from the battery pack 30 and generate the power-supply voltage for operating the control circuit 80. The generated power-supply voltage is also used to activate peripheral circuits of the control circuit 80.

The control circuit 80 is coupled to the rotational direction SW 22, the illuminator 23, a remaining energy display circuit 25, a mode display circuit 26, a trigger SW 32, a manipulation amount detector 34, the mode change SW 36, the impact force change SW 38, and the illuminating SW 40. The trigger SW 32 is included in the aforementioned detector 21b and is turned on by a pulling manipulation on the aforementioned manipulation device 21a. A resistance value of the manipulation amount detector 34 changes depending on an amount of manipulation (pulled amount) on the manipulation device 32. The aforementioned remaining energy display circuit 25 and mode display circuit 26 are arranged in the aforementioned display panel 24.

The control circuit 80 is also coupled to a wireless dongle 60. The wireless dongle 60 wirelessly communicates with an external device such as a smartphone via, for example, a wireless LAN. The wireless dongle 60 enables the user of the driver 1 to set up an operation of the control circuit 80 via the external device.

The motor driver 70 includes an electric current detection circuit 76, a voltage detection circuit 78, a temperature detection circuit 84, and a rotor position detection circuit 52. Detection signals from these detection circuits are delivered to the control circuit 80.

The electric current detection circuit 76 includes a resistor R1 that is serially coupled to a current path on the negative-side of the motor 4. The electric current detection circuit 76 is configured to detect a voltage across the resistor R1 as a current detection signal. The voltage detection circuit 78 is configured to detect the battery voltage supplied from the battery pack 30.

The temperature detection circuit 84 is configured to detect a temperature of the motor driver 70 based on a detection signal from a temperature sensor 82. The rotor position detection circuit 52 is configured to detect a rotational position and the rotational frequency of the motor 4 based on a detection signal from a rotation sensor 50. The rotation sensor 50 is located in the motor 4 and configured to detect the rotational position (angle) of the motor 4. More specifically, the rotation sensor 50 may be implemented with a Hall IC that is configured to generate a rotation detection signal every time the motor 4 rotates for a given angle. The Hall IC may include, for example, three Hall elements, which may be arranged to respectively correspond to the U, V, and W phases of the motor 4.

The control circuit 80 is configured to set the rotational frequency and the rotational direction of the motor 4 in accordance with inputs received from the rotational direction SW 22, the trigger SW 32, the manipulation amount detector 34, the mode change SW 36, the impact force change SW 38, and the wireless dongle 60. The control circuit 80 is also configured to drive control the motor 4 based on the aforementioned detection signals.

Hereinafter, a control process executed in the control circuit 80 to drive control the motor 4 will be explained.

Figure 3:
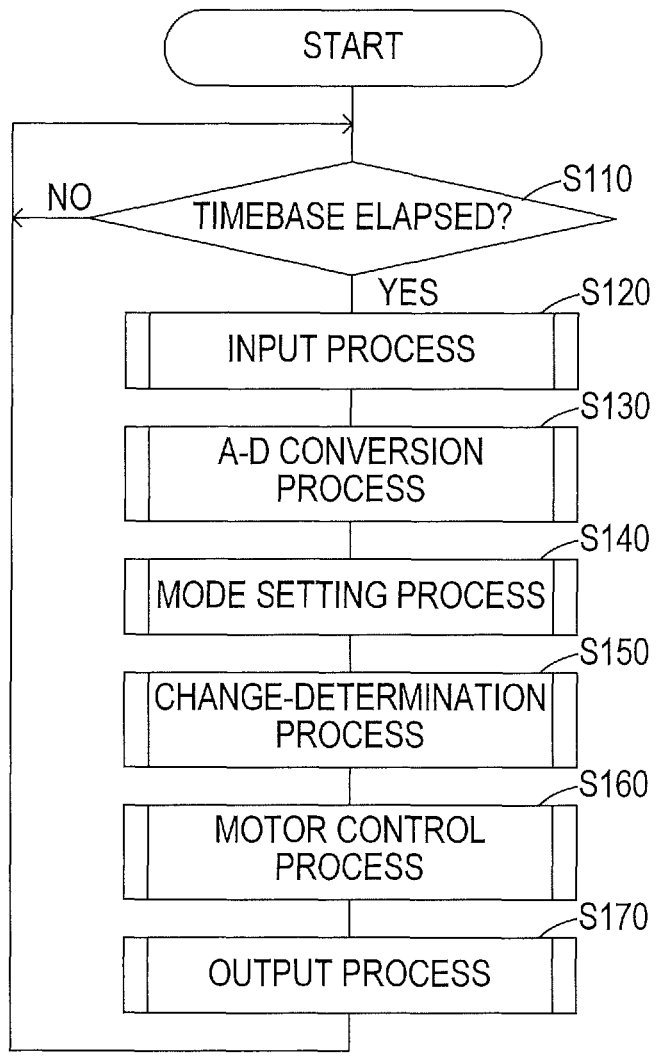
FIG. 3 is a flow chart showing control process executed in a control circuit.

As shown in FIG. 3, the control circuit 80 repeatedly executes a series of processes from S120 to S170 (S represents step) at a specified control cycle (timebase). Specific processes are explained below.

In S110, the control circuit 80 waits for an elapse of the specified control cycle by determining whether the timebase has elapsed (S110: NO). If the control circuit 80 determines that the timebase has elapsed (S110: YES), then the control circuit 80 proceeds the process to S120.

Figure 4:
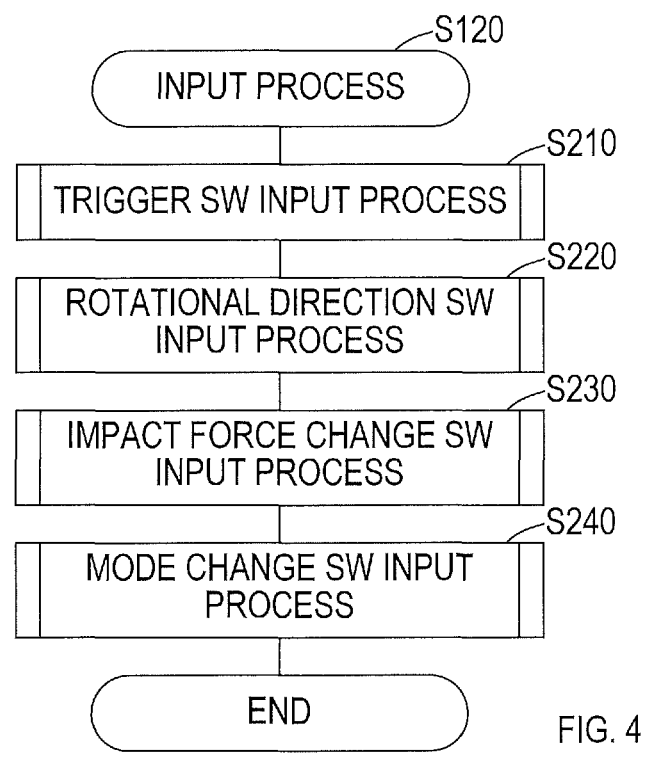
FIG. 4 is a flow chart showing input process executed in S120 in FIG. 3.

In S120, the control circuit 80 executes an input process shown in FIG. 4.

As shown in FIG. 4, in this input process, the control circuit 80 executes a trigger SW input process in S210 and detects whether the trigger SW 32 is placed in the ON state or in the OFF state. In response to a completion of the trigger SW input process, the control circuit 80 then executes a rotational direction SW input process in S220 to detect a rotational direction of the motor 4 at the time of the drive of the motor 4 based on the ON/OFF state of the rotational direction SW 22.

In the subsequent S230, the control circuit 80 executes an impact force change SW input process to detect whether the impact force change SW 38 is placed in the ON state or in the OFF state. In response to a completion of the impact force change SW input process, the control circuit 80 then executes a mode change SW input process in S240 to detect whether the mode change SW 36 is placed in the ON state.

In response to a completion of the mode change SW input process, the control circuit 80 then ends the input process in S120 and proceed to S130 as shown in FIG. 3.

In S130, the control circuit 80 executes an analog to digital (A-D) conversion process. In the A-D conversion process, the control circuit 80 converts the amount of manipulation (pulled amount) of the trigger 21 delivered from the manipulation amount detector 34, a detection signal from the electric current detection circuit 76, the detection signal from the voltage detection circuit 78, and the detection signal from the temperature detection circuit 84 into respective digital value, and store the respective digital value into the RAM inside the control circuit 80.

In S140, the control circuit 80 executes a mode-setting process to set the operation mode of the driver 1 at the time of driving the motor 4 based on the ON state or the OFF state of the mode change SW 36 and the impact force change SW 38 detected in the input process in S120.

More specifically, in S140, the control circuit 80 changes the operation mode of the driver 1 from the speed-change mode to the normal mode, or from the normal mode to the speed-change mode alternately every time the mode change SW 36 is placed in the ON state.

Also, if the impact force change SW 38 is placed in the ON state, then the control circuit 80 changes the control pattern of the rotational frequency of the motor 4 in the speed-change mode.

As shown in FIG. 5, the speed-change mode in the present embodiment includes a first low speed mode, a second low speed mode, a third low speed mode, a first high speed mode, a second high speed mode, and a third high speed mode.

The control circuit 80 has a first change rate and a second change rate, each of which specifies a change characteristic in the rotational frequency of the motor 4 from the low speed rotation to the high speed rotation in the speed-change mode. The first change rate has a first slope (or gradient) A; the second change rate has a second slope B that is steeper than the first slope A (which means that A<B).

The first to third low speed modes, the first to third high speed modes, and the first and second change rates are each allocated to one of the screws SCWa to SCWi depending on the types (characteristics) of the screws SCWa to SCWi. The screws SCWa to SCWi are designed for being fastened into a workpiece. In the present embodiment, two types of control patterns are allocated for each of the screws SCWa to SCWi; that is, the control circuit 80 has 18 types of control patterns in total.

In S140, every time the user manipulates (turns ON) the impact force change SW 38, the control circuit 80 sequentially selects one control pattern from the aforementioned preset control patterns.

As a consequence, the user can select the control pattern that can produce the impact force suitable for the screw to be fastened into the workpiece.

The first to third low speed modes are provided to change target rotational frequency of the motor 4 at a low speed rotation in three stages, namely High (the third low speed mode), Middle (the second low speed mode), and Low (the first low speed mode). The first to third high speed modes are provided to change target rotational frequency of the motor 4 at a high speed rotation in three stages, namely High (the third high speed mode), Middle (the second high speed mode), and Low (the first high speed mode).

In the present embodiment, the control circuit 80 uses a map or an arithmetic expression to set command rotational frequency of the motor 4 in accordance with the amount of manipulation. More specifically, the control circuit 80 has a respective map or a respective arithmetic expression for each of the first to third low speed modes and the first to third high speed modes.

In other words, to rotate the motor 4 at a low speed, the control circuit 80 sets the command rotational frequency by using the respective map or the respective arithmetic expression corresponding to the first to third low speed modes. Similarly, to rotate the motor 4 in a high speed, the control circuit 80 sets the command rotational frequency by using the respective map or the respective arithmetic expression corresponding to the first to third high speed modes.

Figure 6:
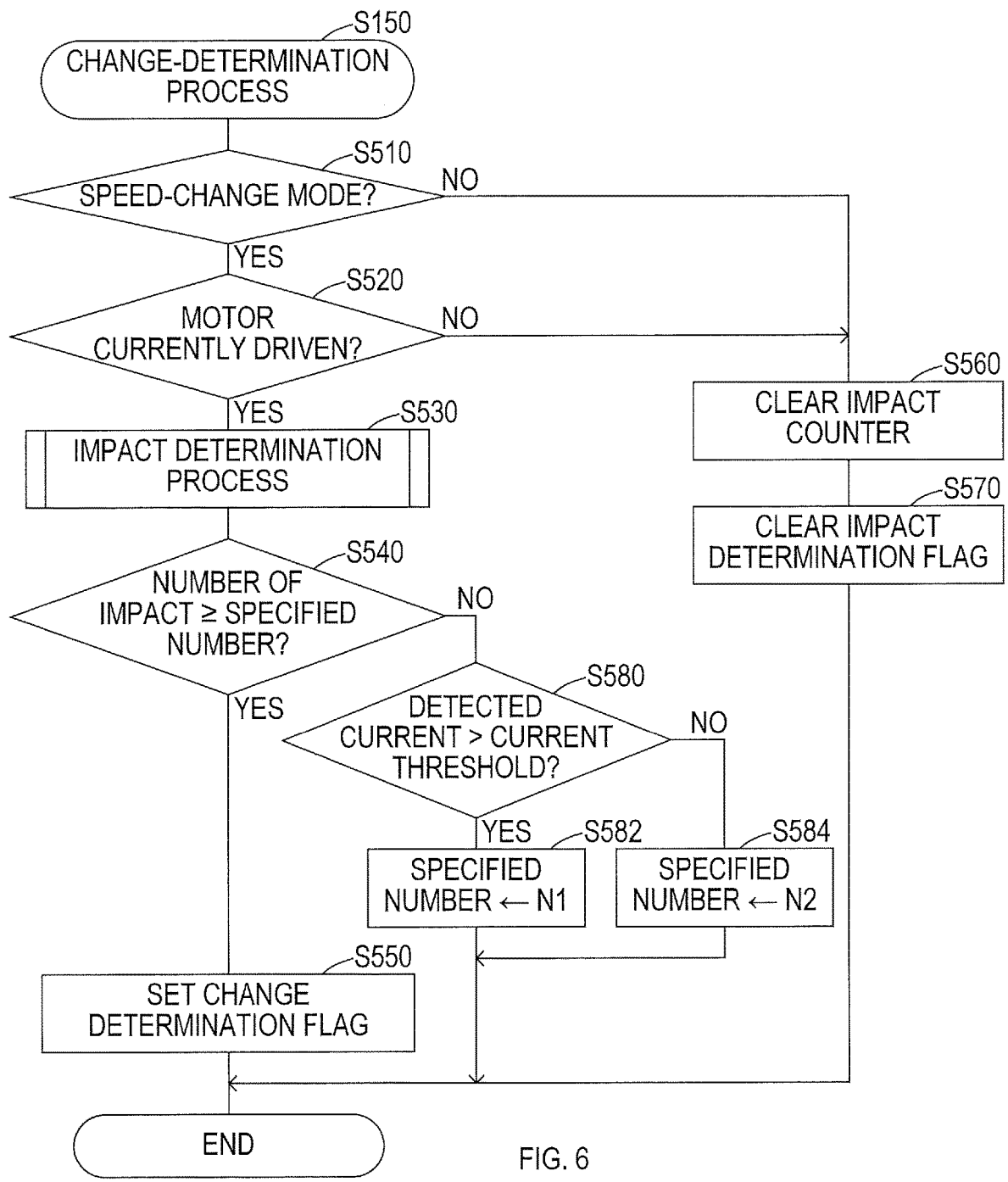
FIG. 6 is a flow chart showing change-determination process executed in S150 in FIG. 3.

In S150, the control circuit 80 executes a change-determination process shown in FIG. 6. In the change-determination process, the control circuit 80 determines whether the rotational state of the motor 4 should be changed from the low speed rotation to the high speed rotation. This determination is made by determining whether the condition for changing the rotational frequency of the motor 4 is established based on the number of impact by the impact mechanism 6 in the speed-change mode.

More specifically, as shown in FIG. 6, the control circuit 80 first determines in S510 in the change-determination process whether the operation mode is currently set to the speed-change mode.

If the operation mode is in the speed-change mode (S510: YES), then the control circuit 80 proceeds the process to S520 and determines whether the motor 4 is currently being driven. If the motor 4 is currently being driven (S520: YES), then the control circuit 80 proceeds the process to S530 and executes an impact determination process.

In the impact determination process, the control circuit 80 detects the impact by the impact mechanism 6 from a change in the rotational frequency of the motor 4 obtained from the detection signal transmitted by the rotation sensor 50, and counts the detected number (the number of impact). The impact may also be detected by detecting a change in current detected by the current detection circuit 76, or also by detecting a vibration generated by the impact by using a device such as an acceleration sensor. In the subsequent S540, the control circuit 80 determines whether the number of impact counted in the impact determination process is equal to or greater than a preset specified number.

If the control circuit 80 determines that the number of impact is equal to or greater than the specified number (S540: YES), then the control circuit 80 proceeds the process to S550, sets a change-determination flag indicating that the rotational state of the motor 4 is changed from the low speed rotation to the high speed rotation, and ends the change-determination process.

If the control circuit 80 determines in S540 that the number of impact does not reach the specified number (S540: NO), then the control circuit 80 proceeds the process to S580 and determines whether a value of the electric current detected in the current detection circuit 76 (hereinafter also referred to as detected current value) exceeds an electric current threshold value that is preset for determining the load.

If the control circuit 80 determines that the detected current value exceeds the electric current threshold value (in other words, the load imposed on the motor 4 is large) (S580: NO), then the control circuit 80 proceeds the process to S582, sets the aforementioned specified number to a preset first number N1, and ends the change-determination process.

If the control circuit 80 determines in S580 that the detected current value is equal to or less than the electric current threshold value (in other words, the load imposed on the motor 4 is small) (S580: YES), then the control circuit 80 proceeds the process to S584, sets the aforementioned specified number to a preset second number N2, and ends the change-determination process.

The first number N1 is greater than the second number N2. This is for the purpose of elongating the duration of time before changing the rotational state of the motor 4 from the low speed rotation to the high speed rotation by increasing the specified number when the load imposed on the motor 4 is large compared with when the load imposed on the motor 4 is small. As a consequence, the driver 1 can securely tighten the fastener to the workpiece at the low rotational speed.

Also as a consequence, disengagement of a driver bit from the fastener can be reduced when the rotational state of the motor 4 is changed to the high speed rotation and the fastener is tightened with the high speed rotation.

In S510, if the control circuit 80 determines that the operation mode is not in the speed-change mode (in other words, placed in the normal mode) (S510: NO), then the control circuit 80 proceeds the process to S560. Alternatively, in S520, if the control circuit 80 determines that the motor 4 is currently not being driven (S520: NO), then the control circuit 80 proceeds the process to S560.

In S560, the control circuit 80 clears an impact counter that is used to count the number of impact in S530 and proceeds the process to S570. In S570, the control circuit 80 clears an impact determination flag and ends the change-determination process.

As mentioned above, in response to an execution of the change-determination process in S150, the control circuit 80 proceeds the process to the subsequent S160 as shown in FIG. 3 and executes a motor control process in accordance with the procedures shown in FIG. 7 to FIG. 13. In S170, the control circuit 80 executes an output process that includes displaying the remaining energy of the battery 29 on the display panel 24, displaying the operation mode on the display panel 24, and turning on the illuminator 23. The control circuit 80 then proceeds the process to S110.

Figure 7:
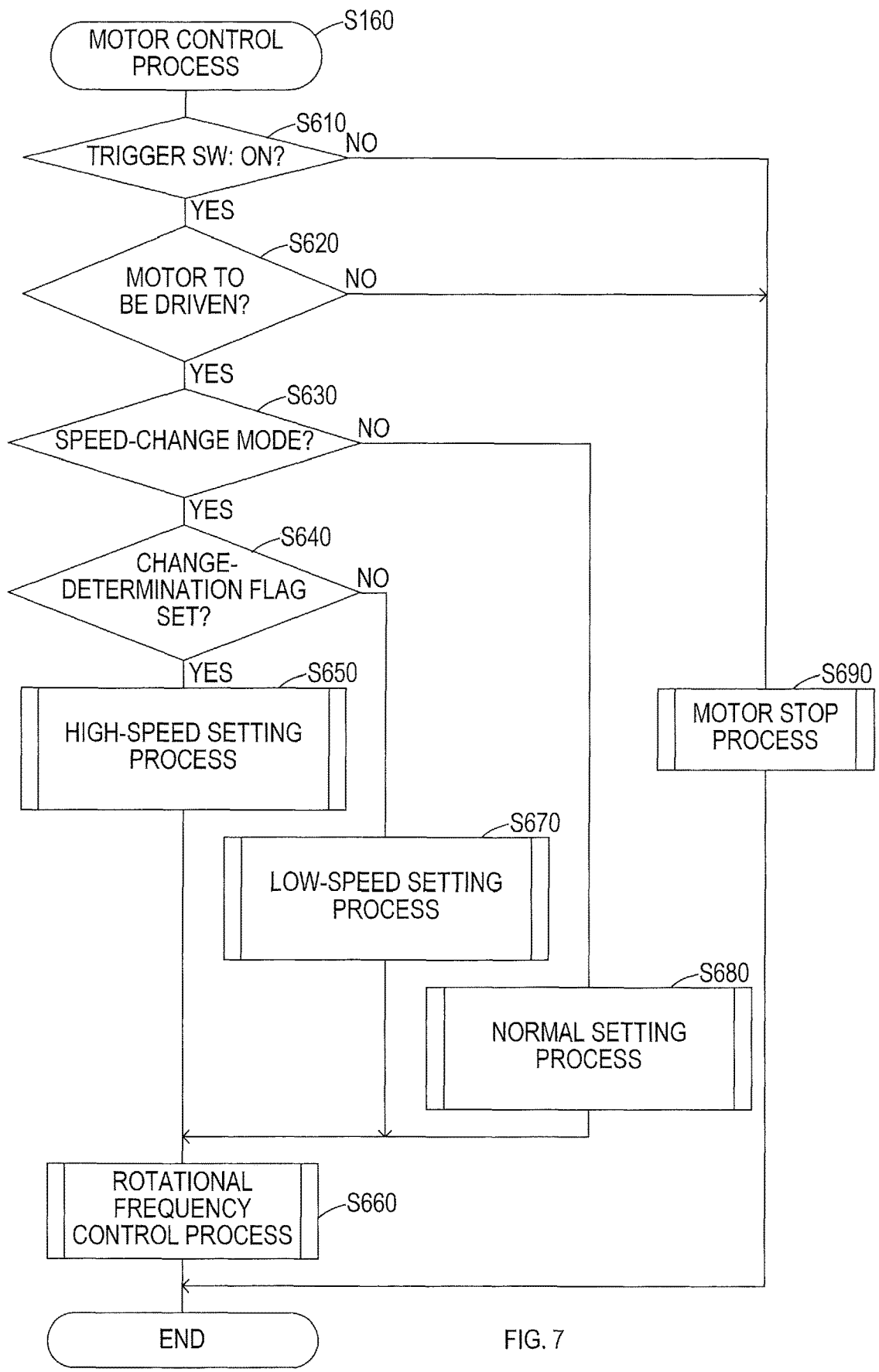
FIG. 7 is a flow chart showing motor control process executed in S160 in FIG. 3.

In the motor control process as shown in FIG. 7, the control circuit 80 first determines in S610 whether the trigger SW 32 is placed in the ON state. If the trigger SW 32 is placed in the ON state (S610: YES), then the control circuit 80 proceeds the process to S620 and determines whether the motor 4 should be driven based on factors such as the amount of manipulation on the trigger 21 detected by the manipulation amount detector 34.

If the control circuit 80 determines that the motor 4 should not be driven in S620 (S620: NO) or that the trigger 21 is placed in the OFF state in S610 (S610: NO), then the control circuit 80 proceeds the process to S690 and executes a motor stop process to stop the motor 4 and then ends the motor control process.

In this motor stop process, the control circuit 80 stops the motor 4 by causing the motor 4 to generate a braking force via the bridge circuit 72. Alternatively, the control circuit 80 places the motor 4 in a free running state by simply interrupting the current conduction by the bridge circuit 72 to eventually stop the motor 4.

If the control circuit 80 determines that the motor 4 should be driven in S620 (S620: YES), the control circuit 80 proceeds the process to S630 and determines whether the operation mode is set to the speed-change mode. If the operation mode is set to the speed-change mode (S630: YES), then the control circuit 80 proceeds the process to S640 and determines whether the change-determination flag is set.

If the control circuit 80 determines in S640 that the change-determination flag is set (S640: YES), then the control circuit 80 proceeds the process to S650 and executes a high-speed setting process to set the command rotational frequency to high rotational frequency. The process then proceeds to S660.

Figure 8:
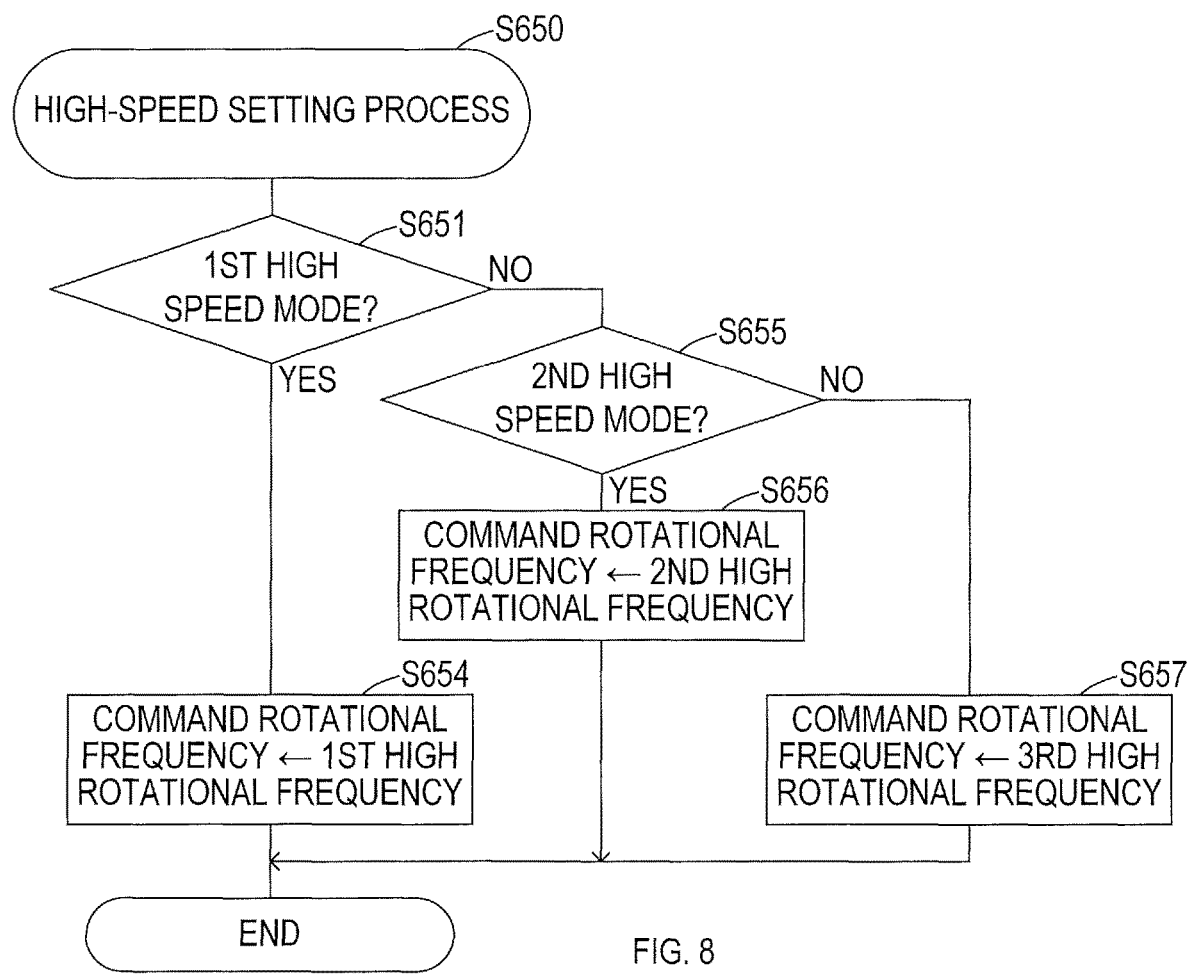
FIG. 8 is a flow chart showing high-speed setting process executed in S650 in FIG. 7.

FIG. 8 shows the procedures for the high-speed setting process.

Firstly, in S651, the control circuit 80 determines whether the first high speed mode is set in the mode-setting process.

If the first high speed mode is set (S651: YES), then the control circuit 80 proceeds the process to S654. In S654, the control circuit 80 calculates the rotational frequency of the motor 4 (first high rotational frequency) from a current amount of manipulation and the map or the arithmetic expression for the first high speed mode, sets the command rotational frequency to the first high rotational frequency, and ends the high-speed setting process.

If the control circuit 80 determines that the first high speed mode is not set (S651: NO), then the control circuit 80 proceeds the process to S655 and determines whether the second high speed mode is set in the mode-setting process.

If the second high speed mode is set (S655: YES), then the control circuit 80 proceeds the process to S656 and calculates the rotational frequency of the motor 4 (second high rotational frequency) from the current amount of manipulation and the map or the arithmetic expression for the second high speed mode, sets the command rotational frequency to the second high rotational frequency, and ends the high-speed setting process.

If the second high speed mode is not set (S655: NO), then the control circuit 80 proceeds the process to S657. In S657, the control circuit 80 calculates the rotational frequency of the motor 4 (third high rotational frequency) from the current amount of manipulation and the map or the arithmetic expression for the third high speed mode, sets the command rotational frequency to the third high rotational frequency, and ends the high-speed setting process.

As shown in FIG. 7, if the control circuit 80 determines in S640 that the change-determination flag is cleared (S640: YES), then the control circuit 80 executes a low-speed setting process in S670 to set the command rotational frequency to low rotational frequency and proceeds the process to S660.

Figure 9:
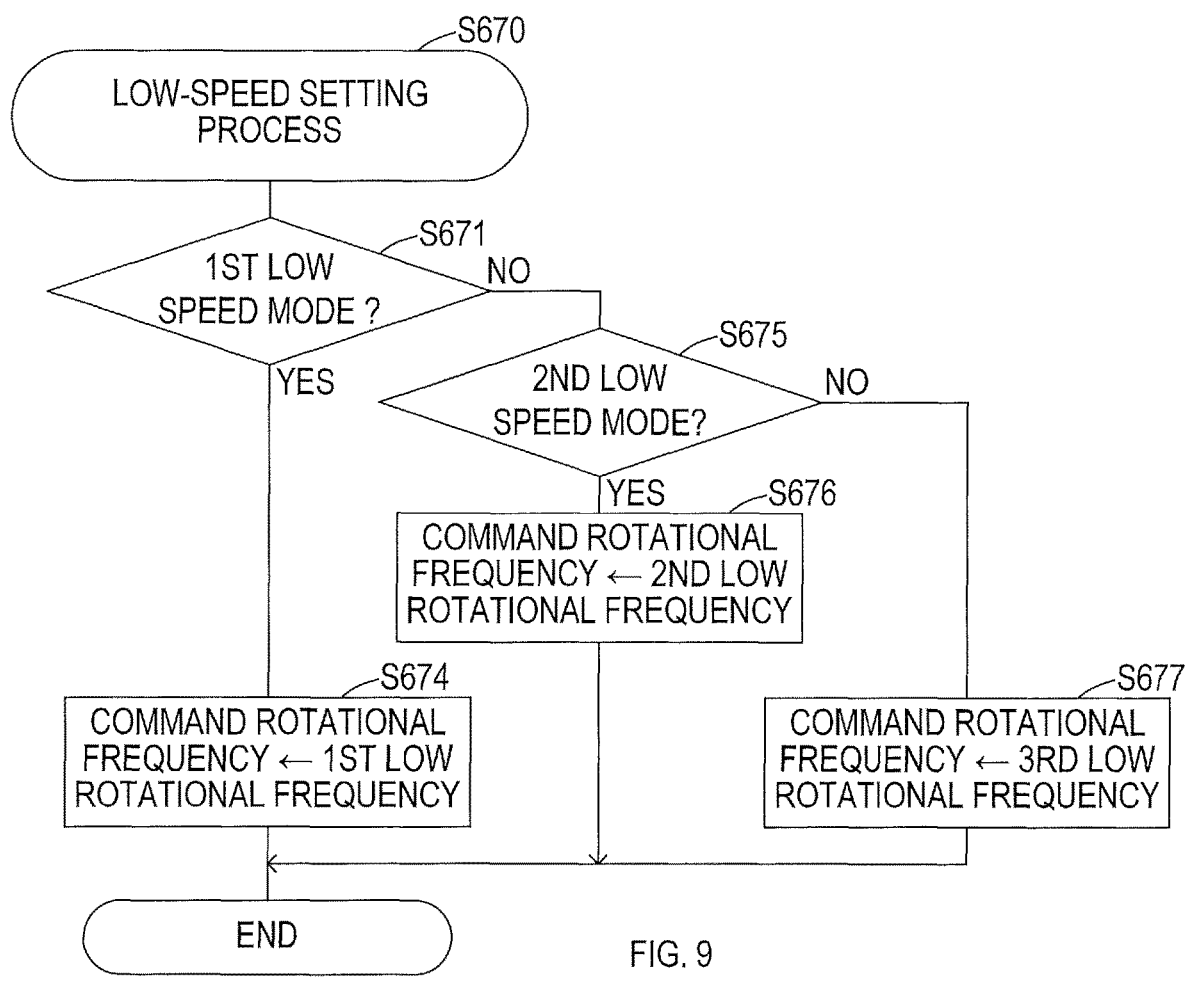
FIG. 9 is a flow chart showing low-speed setting process executed in in S670 in FIG. 7.

FIG. 9 shows the procedures for the low-speed setting process.

Firstly, in S671, the control circuit 80 determines whether the first low speed mode is set in the mode-setting process.

If the first low speed mode is set (S671: YES), then the control circuit 80 proceeds the process to S674. In S674, the control circuit 80 calculates the rotational frequency of the motor 4 (first low rotational frequency) from the current amount of manipulation and the map or the arithmetic expression for the first low speed mode, sets the command rotational frequency to the first low rotational frequency, and ends the low-speed setting process.

If the first low speed mode is not set (S671: NO), then the control circuit 80 proceeds the process to S675. In S675, the control circuit 80 determines whether the second low speed mode is set in the mode-setting process.

If the second low speed mode is set (S675: YES), then the control circuit 80 proceeds the process to S676. In S676, the control circuit 80 calculates the rotational frequency of the motor 4 (second low rotational frequency) from the current amount of manipulation and the map or the arithmetic expression for the second low speed mode, sets the command rotational frequency to the second low rotational frequency, and ends the low-speed setting process.

If the second low speed mode is not set (S675: NO), then the control circuit 80 calculates the rotational frequency of the motor 4 (third low rotational frequency) from the current amount of manipulation and the map or the arithmetic expression for the third low-speed mode, sets the command rotational frequency to the third low rotational frequency, and ends the low-speed setting process.

Figure 10:
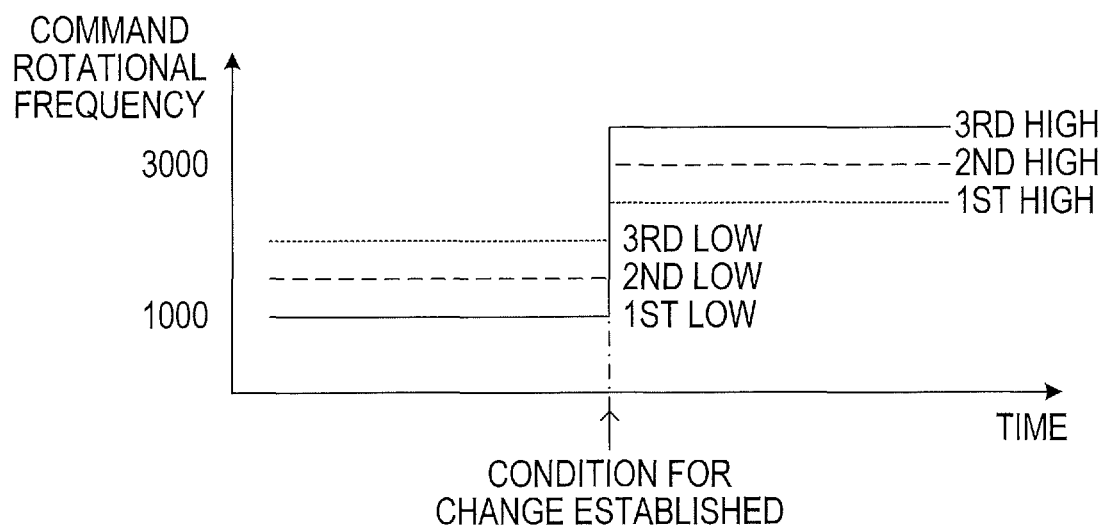
FIG. 10 is an explanatory diagram showing command rotational frequency of the motor that is set in the speed-change mode.

Accordingly, as shown in FIG. 10, the command rotational frequency is set to any one of the first to third low rotational frequencies when the operation mode of the driver 1 is the speed-change mode and the change-determination flag is not set (in other words, condition for change is not established) at the time the motor 4 is being driven.

If the number of impact subsequently reaches the specified number, then the condition for change is established and also the change-determination flag is set. In response to the change-determination flag being set, the command rotational frequency is changed to any one of the first to third high rotational frequencies.

In FIG. 10, each of the first to third low rotational frequencies and the first to third high rotational frequencies is constant. FIG. 10 shows the first to third low rotational frequencies and the first to third high rotational frequencies when the manipulation on the trigger 2 is constant; in reality, these rotational frequencies vary depending on the amount of manipulation.

Returning to S630 in FIG. 7, if the control circuit 80 determines that the operation mode is not the speed-change mode (in other words, that the operation mode is set to the normal mode) (S630: NO), then the control circuit 80 proceeds the process to S680. In S680, the control circuit 80 executes the normal setting process and sets the command rotational frequency simply depending on the amount of manipulation on the trigger 21 without changing the command rotational frequency from any one of the first to third low rotational frequencies to any one of the first to third high rotational frequencies.

Figure 11:
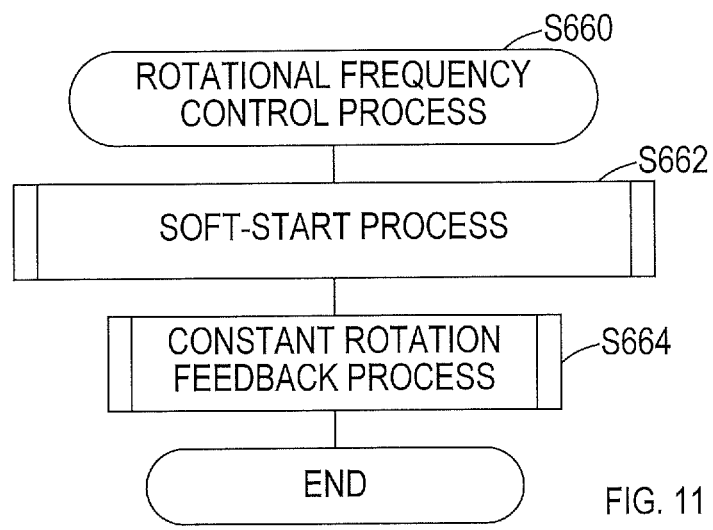
FIG. 11 is a flow chart showing rotational frequency control process executed in S660 in FIG. 7.

In S660, the control circuit 80 executes a rotational frequency control process shown in FIG. 11 to control the rotational frequency of the motor 4 in accordance with the command rotational frequency set in S650, S670, or S680.

As shown in FIG. 11, in the rotational frequency control process, the control circuit 80 first executes a soft-start process in S662 and sets a control rotational frequency for an actual drive of the motor 4 based on the command rotational frequency.

In the subsequent S664, the control circuit 80 executes a constant rotation feedback process and then ends the rotational frequency control process. In the constant rotation feedback process, the control circuit 80 performs a feedback control of the conduction current to the motor 4 such that the actual rotational frequency of the motor 4 matches the control rotational frequency.

More specifically, in the constant rotation feedback process, the control circuit 80 controls the rotational frequency of the motor 4 to match the control rotational frequency by varying the drive duty ratio for a pulse width modulation (PWM) control of the conduction current to the motor 4.

The aforementioned soft-start process is executed for a stable and reliable acceleration of the motor 4 immediately after initiating the drive of the motor 4 or at the time of shifting the rotational state of the motor 4 from the low speed rotation to the high speed rotation. The control rotational frequency is gradually changed to match the command rotational frequency.

In the soft-start process, the control circuit 80 sets the control rotational frequency when increasing the rotation of the motor 4 from the low speed rotation to the high speed rotation in the speed-change mode such that an amount of change in the rotational frequency corresponds to the first change rate (the first slope A) or the second change rate (the second slope B) included in the control pattern that is selected in the mode-setting process.

Figure 12:
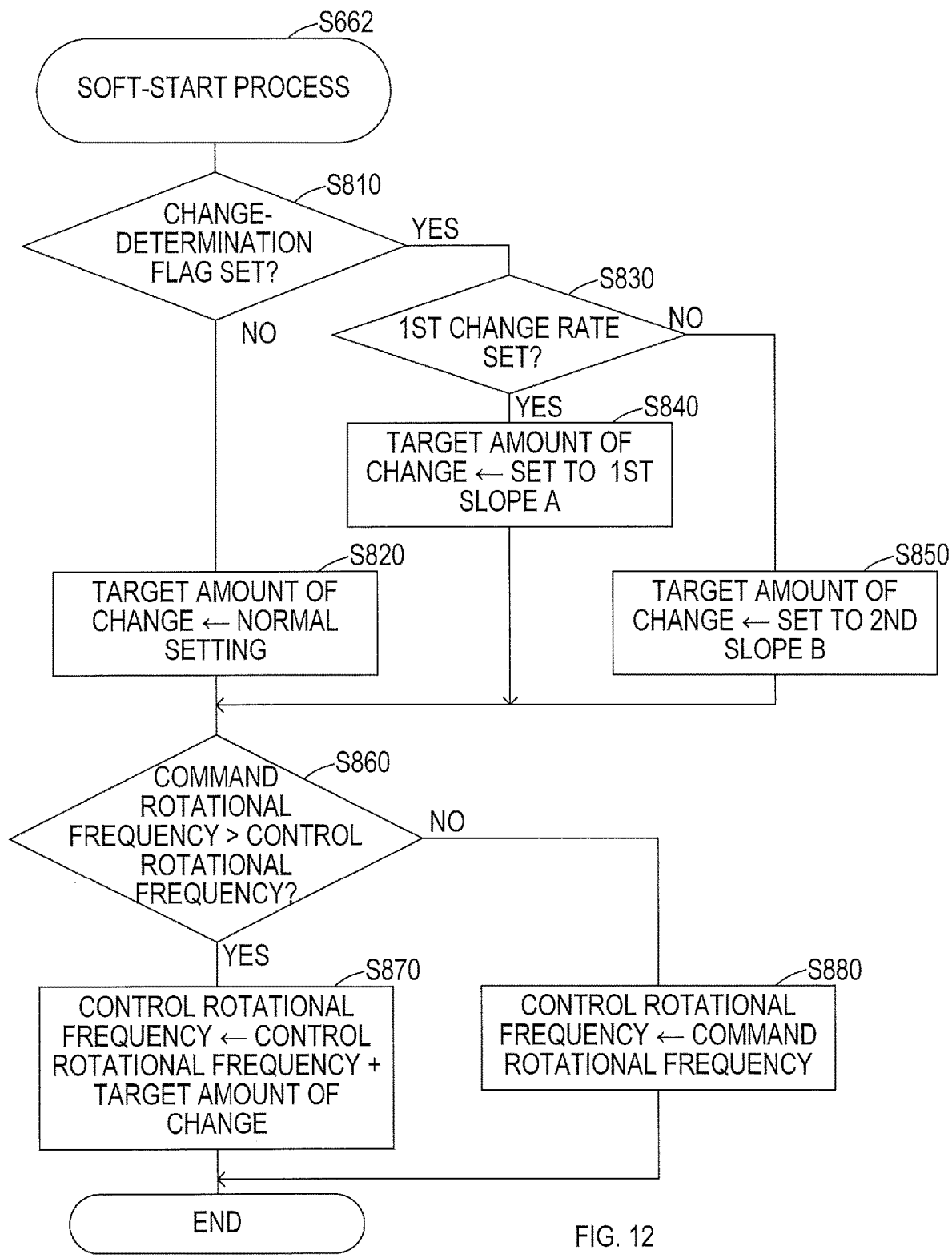
FIG. 12 is a flow chart showing a soft-start process executed in S662 in FIG. 11.

FIG. 12 shows the soft-start process. Firstly, in S810, the control circuit 80 determines whether the change-determination flag is set. If the change-determination flag is not set (S810: NO), then the control circuit 80 proceeds the process to S820. In S820, the control circuit 80 sets a target amount of change to a normal value, which is used to increase the rotation of the motor 4 immediately after initiating the drive of the motor 4.

If the change-determination flag is set (S810: YES), then the control circuit 80 proceeds the process to S830 and determines whether the first change rate (that is, the first slope A) is set in the selected control pattern.

If the first change rate is set (S830: YES), then the control circuit 80 proceeds the process to S840 and sets the target amount of change to an amount of change corresponding to the first slope A. If the second change rate is set (S830: NO), then the control circuit 80 proceeds the process to S850 and sets the target amount of change to an amount of change corresponding to the second slope B.

In response to the target amount of change being set in S820, S840 or S850, the control circuit 80 proceeds the process to S860 and determines whether the command rotational frequency is greater than the control rotational frequency currently used to control the motor 4. The control rotational frequency at the time of initiating the drive of the motor 4 is zero since the motor 4 is stopped.

If the control circuit 80 determines in S860 that the command rotational frequency is greater than the control rotational frequency (S860: YES), then the control circuit 80 proceeds the process to S870. In S870, the control circuit 80 updates the control rotational frequency by adding the target amount of change, which is set in S820, S840 or S850, to the current control rotational frequency and ends the soft-start process.

If the control circuit 80 determines that the command rotational frequency is equal to or less than the control rotational frequency (S860: NO), then the control circuit 80 proceeds the process to S880 and sets the control rotational frequency to the command rotational frequency and ends the soft-start process.

Figure 13:
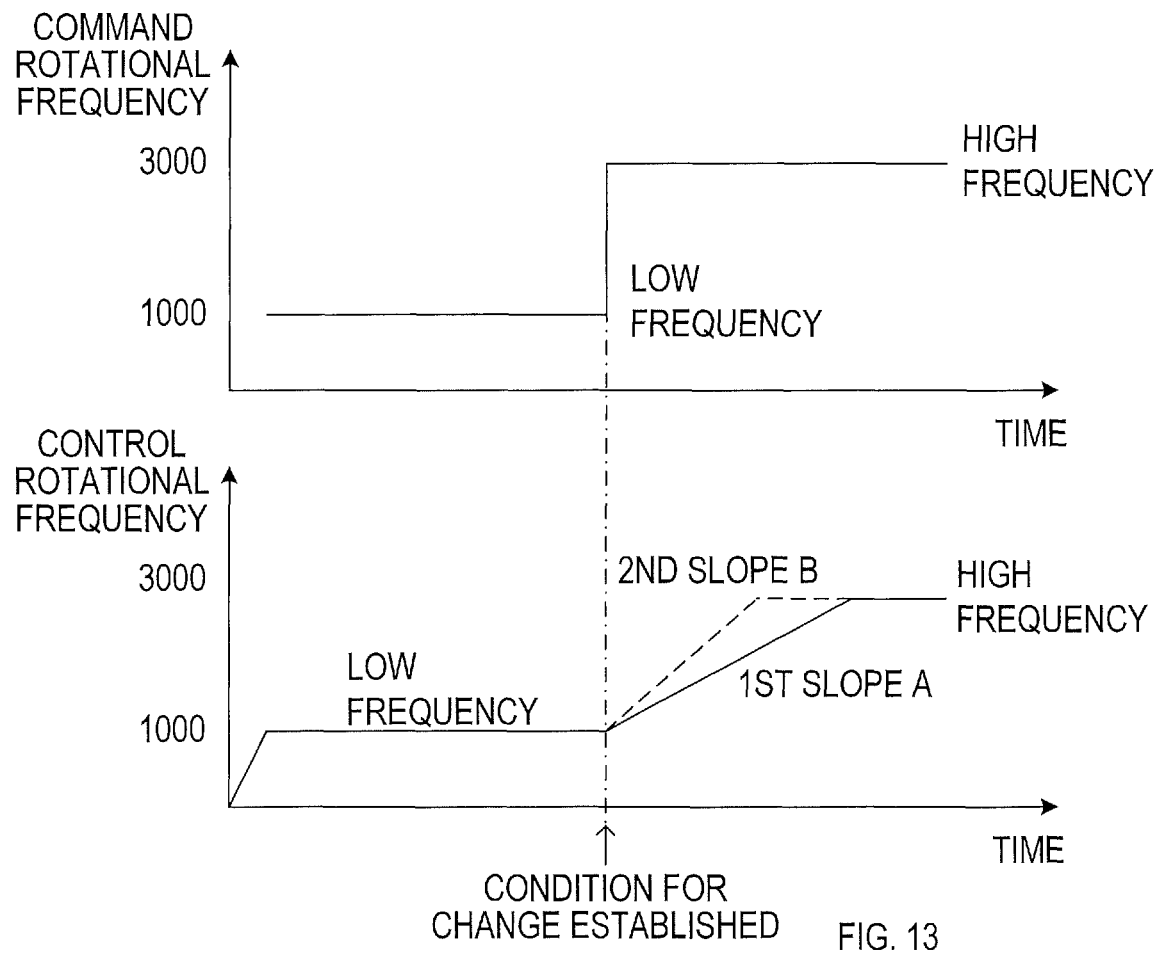
FIG. 13 is an explanatory diagram showing control rotational frequency that is set in the soft-start process.

As a consequence, as shown in FIG. 13, the control rotational frequency that is used in S662 to control the rotational frequency of the motor 4 increases at a normal change rate at the time of initiating the drive of the motor 4. The control rotational frequency increases with the first slope A or the second slope B at the time of changing the rotational state of the motor 4 from the low speed rotation to the high speed rotation in the speed-change mode.

As it has been explained above, in the driver 1 in the present embodiment, if the operation mode at the time of driving the motor 4 is the speed-change mode, then the rotational state of the motor 4 is changed from the low speed rotation to the high speed rotation in response to an establishment of the condition for change, which is achieved by the number of impact reaching the specified number after the drive of the motor 4 is initiated.

In accordance with the control pattern that is selected by the user's manipulation on the impact force change SW 38, the rotational frequency of the motor 4 (namely, the first to third low rotational frequencies and the first to third high rotational frequencies) and the change characteristic in changing the rotational frequency from any one of the first to third low rotational frequencies to any one of the first to third high rotational frequencies are set.

According to the driver 1 in the present embodiment, the user is enabled to appropriately change the rotational frequency of the motor 4 in the speed-change mode and the change characteristic in changing the rotational state of the motor 4 from the low speed rotation to the high speed rotation depending on the type of a fastener or the environment of work.

In the driver 1 of the present embodiment, the number of impact, which is the condition for changing the rotational state of the motor 4 from the low speed rotation to the high speed rotation, is set depending on the current actually flowing to the motor 4 (detected current) before changing the rotational state of the motor 4 from the low speed rotation to the high speed rotation. More specifically, the number of impact is set to a larger value when the detected current is large (that is, when the load on the motor 4 is large).

Consequently, the larger the load is, the longer it takes to change the rotational state of the motor 4 to the high speed rotation. As a result, the fastener can be fastened to the workpiece tightly with the low speed rotation of the motor 4 even when the load is large, which reduces disengagement of the driver bit from the fastener when the rotational state of the motor 4 is changed to the high speed rotation.

The driver 1 in the present embodiment can be thus improved in the usability for the user and in work efficiency on the fastener.

In the present embodiment, the control circuit 80 corresponds to one example of the controller in the present disclosure. In addition, among the processes executed in the control circuit 80, the processes in S580 to S584, in which the specified number that is the condition for change is set in accordance with the detected current (load) in the change-determination process, function as one example of the setter in the present disclosure.

One embodiment of the present disclosure has been explained above; nevertheless, the present disclosure is not limited to the aforementioned embodiment, but can also be modified in various modes.

First Modified Example

In the aforementioned embodiment, the rotational frequency of the motor 4 in each of the low speed rotation and the high speed rotation in the speed-change mode is explained as being set in accordance with the control pattern that is selected by the user's manipulation on the impact force change SW 38.

However, if the rotational frequency of the motor 4 in the high speed rotation is set in accordance with the situation (such as the imposed load and the rotational status) in the motor 4 in the low speed rotation, similar to setting the condition for change in the aforementioned embodiment, then the work with the driver 1 after the rotational state is changed to the high speed rotation can be conducted more stably.

Figure 14:
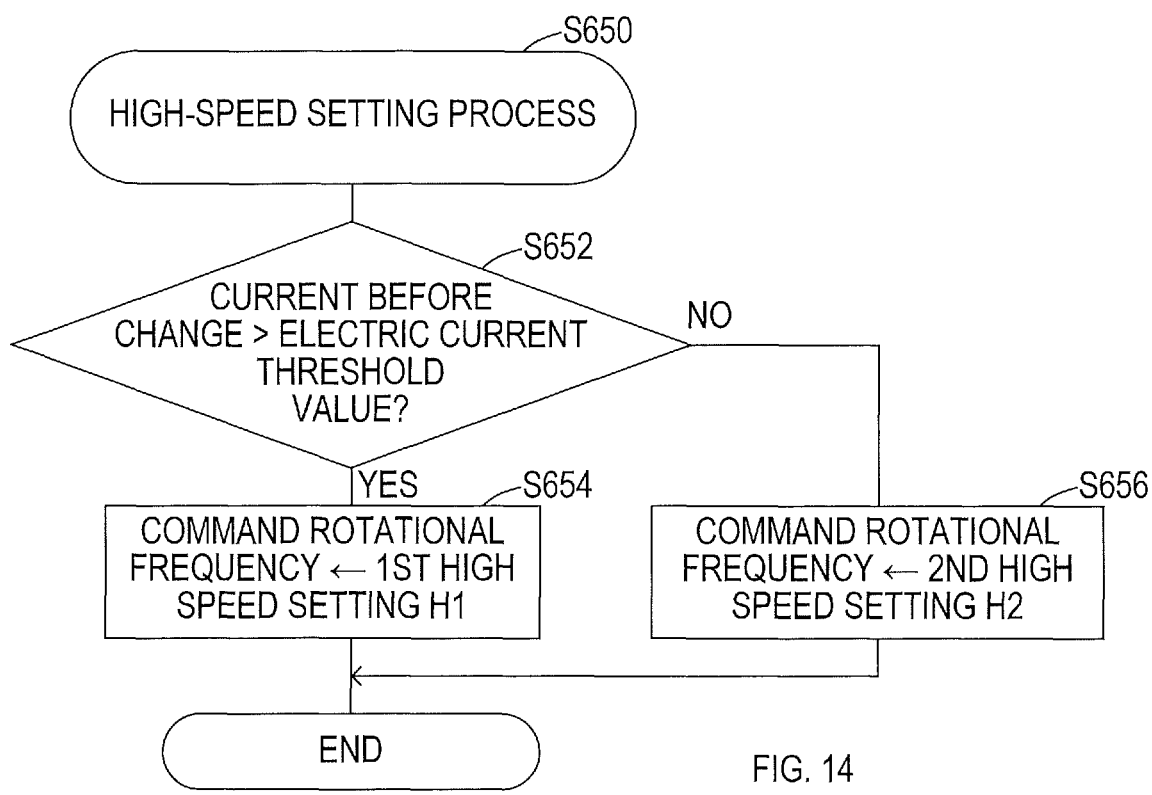
FIG. 14 is a flow chart showing a high-speed setting process in a first modified example.

To achieve such an operation, the high-speed setting process executed in S650 in the motor control process, which is shown in FIG. 7, may be executed in accordance with the procedures shown in FIG. 14.

In the high-speed setting process shown in FIG. 14, the control circuit 80 first determines in S652 whether the detected current value, which is detected in the electric current detection circuit 76 before the rotational state of the motor 4 is changed from the low speed rotation to the high speed rotation, exceeds the electric current threshold value that is preset for determining the load.

If the control circuit 80 determines in S652 that the detected current value exceeds the electric current threshold value (S652: YES), then the control circuit 80 proceeds the process to S654. If the control circuit 80 determines in S652 that the detected current value does not exceed the electric current threshold value (S652: NO), then the control circuit 80 proceeds the process to S656.

In S654, since the load imposed on the motor 4 is large, the control circuit 80 uses a map or an arithmetic expression for high load to obtain the rotational frequency of the motor 4 (first high-speed setting H1), sets this first high-speed setting H1 to the command rotational frequency, and ends the high-speed setting process.

In S656, since the load imposed on the motor 4 is low, the control circuit 80 uses a map or an arithmetic expression for low load to obtain the rotational frequency of the motor 4 (second high-speed setting H2), sets this second high-speed setting H2 to the command rotational frequency, and ends the high-speed setting process.

Figure 15:
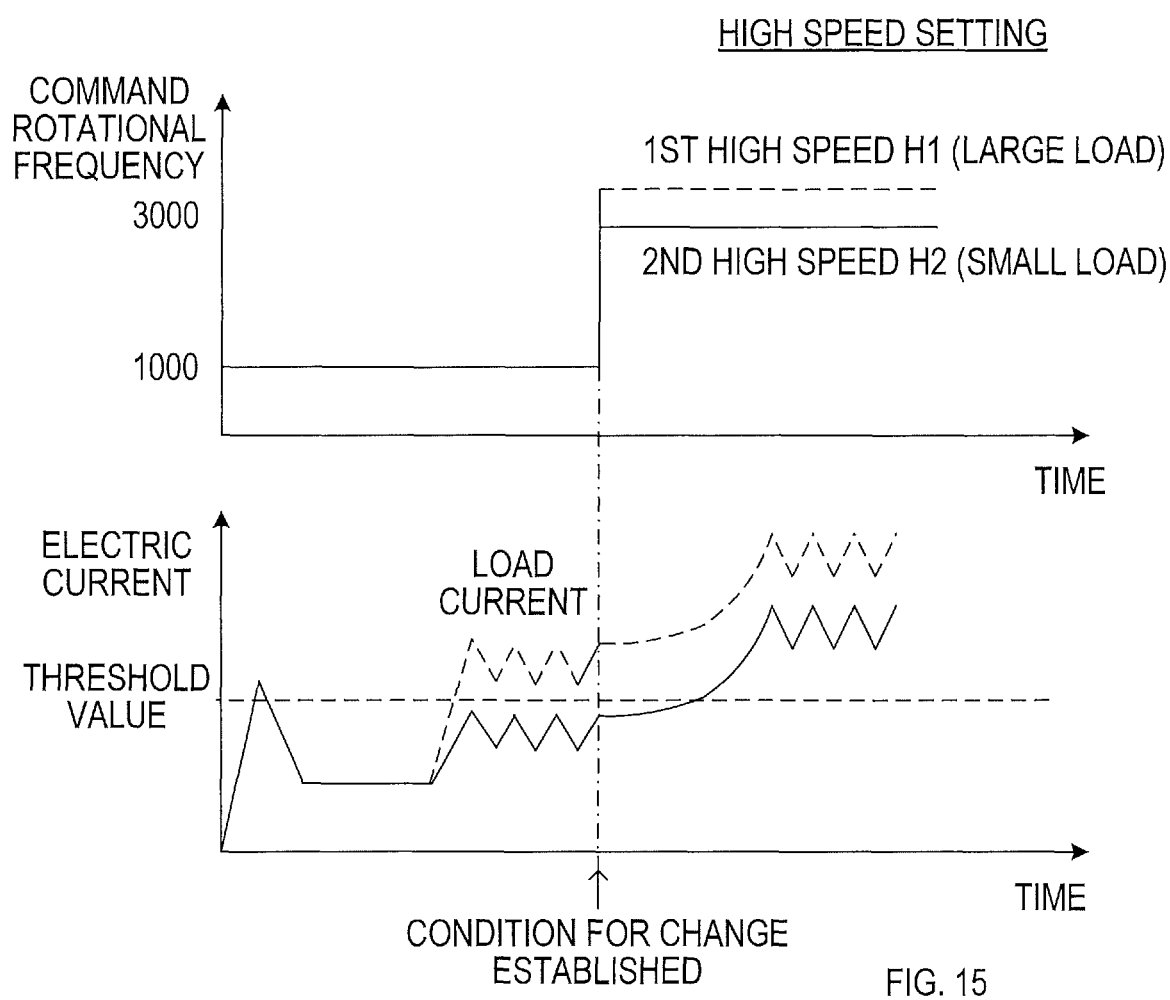
FIG. 15 is a time chart showing a relationship between a command rotational frequency and a load current, the command frequency being set in the high-speed setting process in FIG. 14.

As shown in FIG. 15, the maps or the arithmetic expressions used in S654 and S656 are preset such that the command rotational frequency (first high-speed setting H1) that is set when the imposed load is large (in large load) exceeds the command rotational frequency (second high-speed setting 112) that is set when the imposed load is small (in small load).

Thus, the command rotational frequency in large load is greater than the command rotational frequency in small load in response to the same amount of manipulation on the trigger 21. This is due to a need of a greater impact force when the load imposed on the motor 4 by the fastener such as a screw is large compared with a case where the imposed load is small.

If the command rotational frequency after changing the rotational state of the motor 4 from the low speed rotation to the high speed rotation is set based on the detected current value before changing the rotational state of the motor 4 (a value of load current shown in FIG. 15), then the tightening of the fastener with the high speed rotation can be finished more securely in a short time to therefore improve the work efficiency.

Second Modified Example

In the aforementioned embodiment, it is explained that, in the motor control process, the command rotational frequency of the motor 4 is set as the control variable of the motor 4, and the control rotational frequency for actually controlling the motor 4 is set based on the command rotational frequency.

This is for executing a feed-back control to match the rotational frequency of the motor 4 to the control rotational frequency, which is the ultimate target value. Nevertheless, it is not always necessary to execute the feed-back control to drive the motor 4.

More specifically, for example, an open loop control may be executed by setting a duty ratio (drive duty ratio) of the PWM signal, which is used to directly control the magnitude of the conduction current to the motor 4, as the control variable of the motor 4.

In this case, the drive duty ratio (DRIVE DUTY in FIG. 17), which is a current conduction parameter corresponding to the amount of manipulation on the trigger 21, may be set individually for the high speed rotation, the low speed rotation, and the normal rotation respectively in S650, S670, and S680 in the motor control process shown in FIG. 7.

By setting the drive duty ratio in the high speed rotation in accordance with the load on the motor 4, the same effect as the aforementioned effect in the first modified example can be attained.

Figure 16:
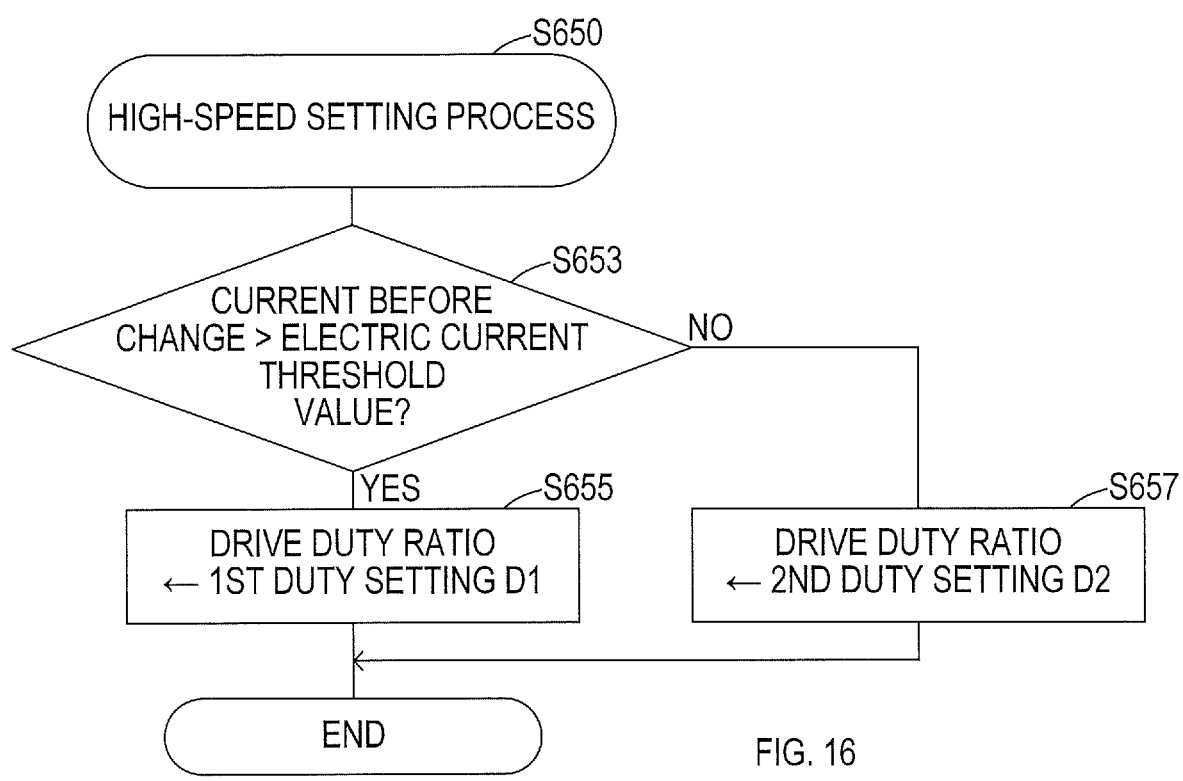
FIG. 16 is a flow chart showing a high-speed setting process in a second modified example.

Specifically, the high-speed setting process executed in S650 in the motor control process, which is shown in FIG. 7, may be executed in accordance with the procedures shown in FIG. 16.

To be more specific, in the high-speed setting process shown in FIG. 16, the control circuit 80 first determines in S653 whether the detected current value, detected in the current detection circuit 76 before changing the rotational state of the motor 4 from the low speed rotation to the high speed rotation, exceeds the electric current threshold value.

If the control circuit 80 determines that the detected current value exceeds the electric current threshold value (S653: YES), then the control circuit 80 proceeds the process to S655.

In S655, since the load imposed on the motor 4 is large, the control circuit 80 uses the map or the arithmetic expression for the large load to obtain the drive duty ratio of the motor 4 (first DUTY setting D1), and ends the high-speed setting process.

If the control circuit 80 determines that the detected current value does not exceed the electric current threshold value (S653: NO), then the control circuit 80 proceeds the process to S657. In S657, since the load imposed on the motor 4 is small, the control circuit 80 uses the map or the arithmetic expression for the small load to obtain the drive duty ratio of the motor 4 (second DUTY setting D2), and ends the high-speed setting process.

Figure 17:
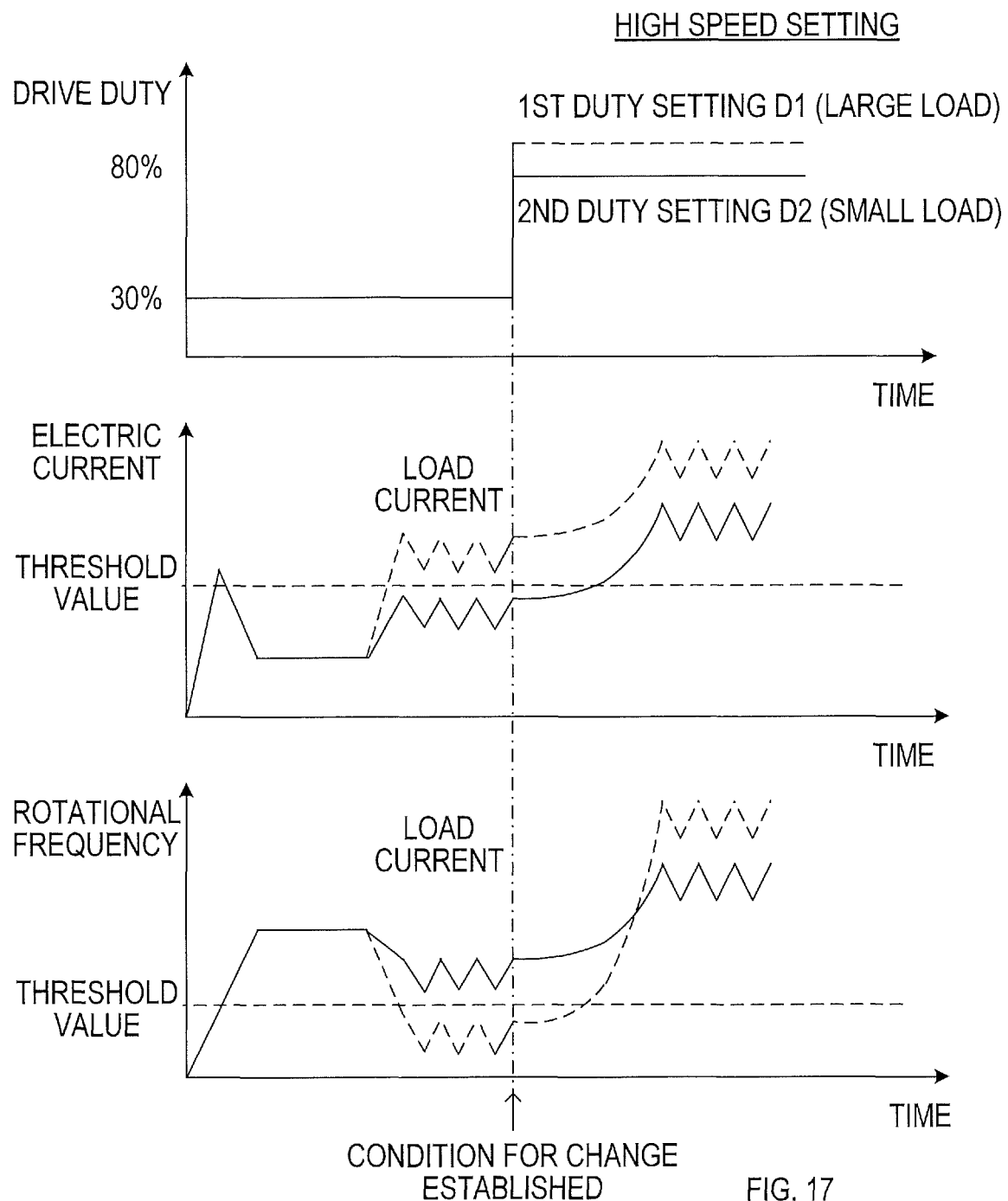
FIG. 17 is a time chart showing a relationship between a command DUTY, a load current, and a rotational frequency, the command DUTY being set in the high-speed setting process in FIG. 16.

As shown in FIG. 17, the maps or the arithmetic expressions used in S655 and S657 to respectively obtain the first DUTY setting D1 and the second DUTY setting D2 are preset such that the first DUTY setting D1 is greater than the second DUTY setting D2.

Thus, the drive duty ratio (DRIVE DUTY) in the large load is greater than the drive duty ratio in the small load in response to the same amount of manipulation on the trigger 21. This is due to a need of a greater impact force when the load imposed on the motor 4 by the fastener is large compared with a case where the imposed load is small.

In the first modified example and in the second modified example, it is explained that the command rotational frequency, which is a target control value, or the drive duty ratio, which is a conduction current control variable, is set in two stages in accordance with the value of the electric current (the detected current value) that flows to the motor 4. Nevertheless, they may be set in multiple stages greater than the two stages.

Third Modified Example

In the aforementioned embodiment, it is explained that in the change-determination process shown in FIG. 6, the specified number (the condition for change) is set depending on whether the detected current value before changing the rotational state of the motor 4 from the low speed rotation to the high speed rotation is greater than the electric current threshold value.

However, the specified number may be a fixed value in a case where the command rotational frequency and the drive duty ratio in the high speed rotation of the motor 4 are set based on the detected current value (magnitude of the load, in other words) in the low speed rotation of the motor 4 as described in the first modified example and in the second modified example.

Figure 18:
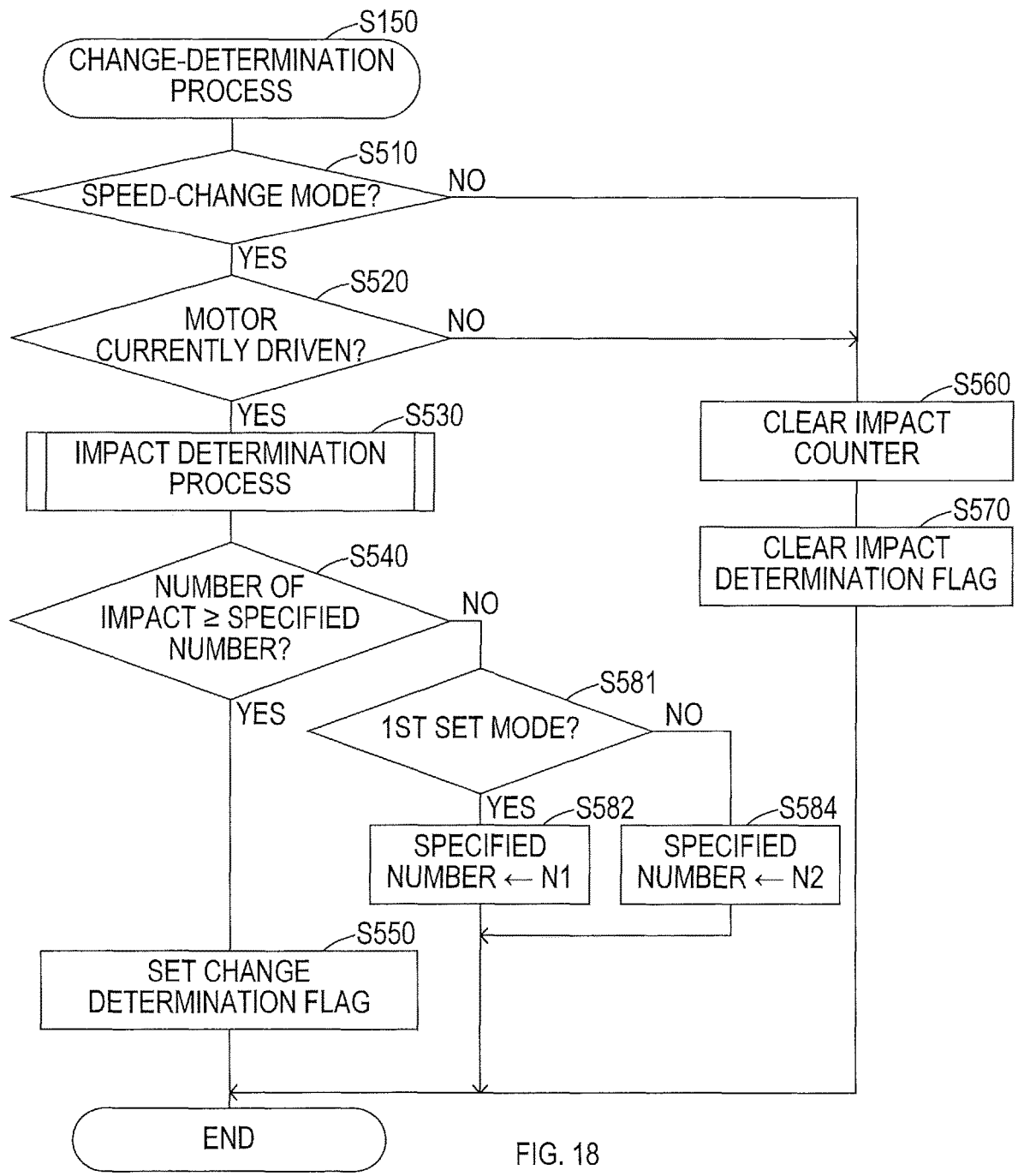
FIG. 18 is a flow chart showing a change-determination process in a third modified example.

Alternatively, as shown in FIG. 18, the specified number may be set to either the first number N1 or the second number N2 based on the set mode selected by the user.

The change-determination process shown in FIG. 18 is different from the change-determination process shown in FIG. 6. Specifically, in place of determining the detected current value (the magnitude of the load, in other words) in S580 in FIG. 6, the control circuit 80 determines in S581 in FIG. 18 whether the set mode selected by the user is a first set mode.

In the change-determination process shown in FIG. 18, if the control circuit 80 determines in S581 that the set mode is the first set mode (S581: YES), then the control circuit 80 sets the specified number to the first number N1 (S582);

otherwise (S581: NO), the control circuit 80 sets the specified number to the second number N2 (S584).

In this case, the user can optionally set the condition for change, and thus the driver 1 can be improved in the usability for the user compared with a case where the condition for change is fixed.

Fourth Modified Example

In the aforementioned embodiment and the third modified example, it is explained that the number of impact is used when determining whether the rotational state of the motor 4 should be changed from the low speed rotation to the high speed rotation in the change-determination process. Nevertheless, this determination may be made based on the value of the electric current that flows to the motor 4 (the magnitude of the load, in other words).

It is not limited to the rotational impact tools having the impact mechanism likewise the driver 1 that needs to change the rotational state of the motor 4 from the low speed rotation to the high speed rotation. For example, in a case where an externally imposed load is increased in an electric working machine, work efficiency can be improved by reducing the rotation of the motor when the load is small, and increasing the rotation of the motor when the load is large by changing the rotational state of the motor from the low speed rotation to the high speed rotation.

Figure 19:
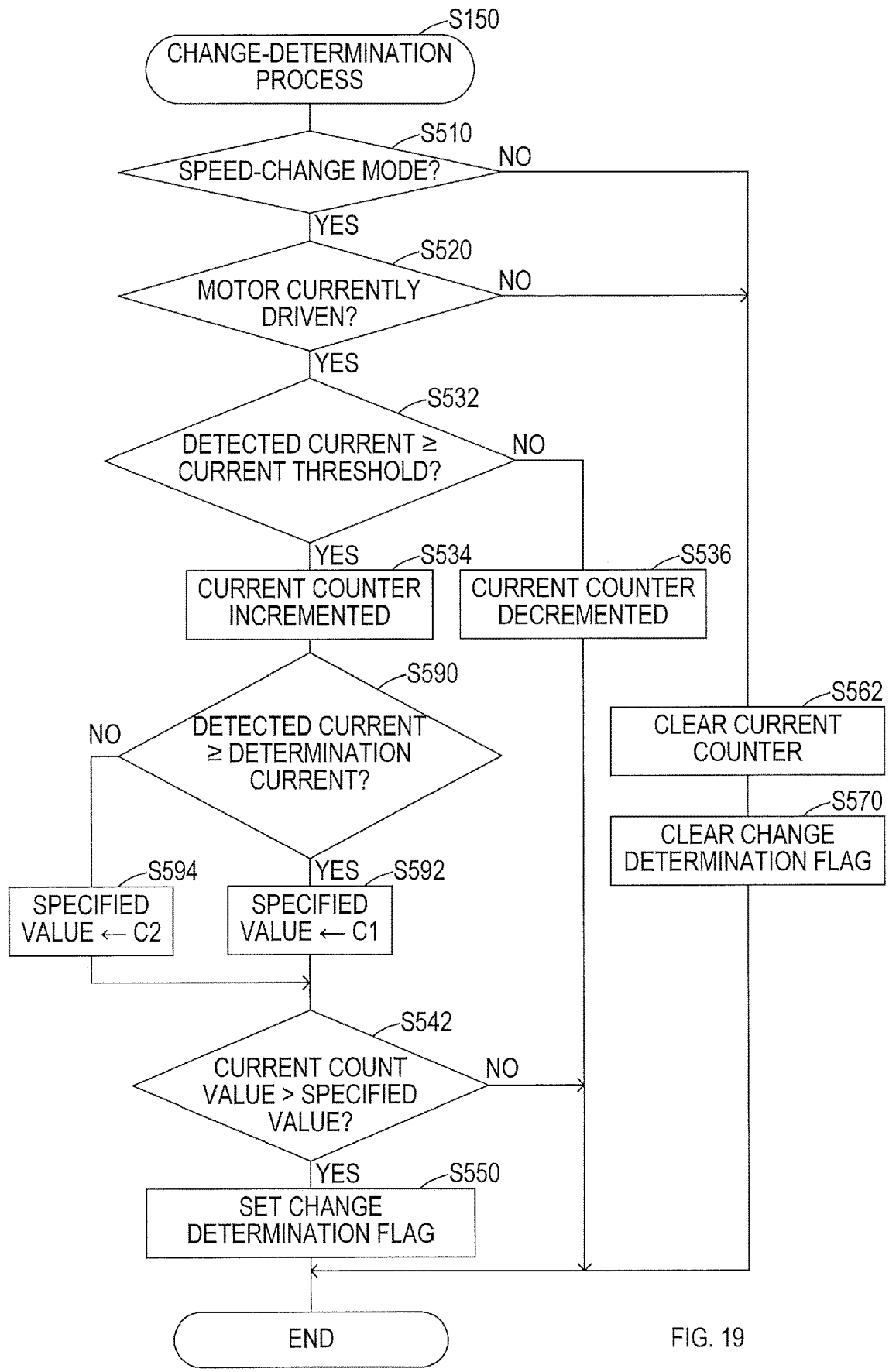
FIG. 19 is a flow chart showing a change-determination process in a fourth modified example.

Accordingly, the change determination may also be applied to and executed in such an electric working machine based on the detected current value detected by the current detection circuit 76 in the change-determination process as shown in FIG. 19, so as to appropriately change the rotational state of the motor from the low speed rotation to the high speed rotation.

In the change-determination process shown in FIG. 19, if the control circuit 80 determines that the operation mode is set to the speed-change mode (S510: YES) and also determines that the motor 4 is being driven (S520: YES), the control circuit 80 proceeds the process to S532.

In S532, the control circuit 80 determines whether the detected current value detected in the current detection circuit 76 is equal to or greater than the electric current threshold value. If the detected current value is equal to or greater than the electric current threshold value (S532: YES), the control circuit 80 increments an electric current counter in S534.

If the control circuit 80 determines that the detected current value is less than the electric current threshold value, then the control circuit 80 proceeds the process to S536, decrements the electric current counter, and ends the change-determination process.

In the processes of S532 to S536, the control circuit 80 increments or decrements the electric current counter depending on whether the detected current value is equal to or greater than the electric current threshold value. As a consequence, the control circuit 80 can determine the magnitude of the load imposed on the motor 4 by the fastener based on the value of the electric current counter (electric current count value).

In S534, if the electric current counter is incremented, then the control circuit 80 proceeds the process to S542 and determines whether the electric current count value exceeds a specified value. If the electric current count value does not exceed the specified value (S542: NO), the control circuit 80 ends the change-determination process.

If the control circuit 80 determines in S542 that the electric current count value exceeds the specified value (S542: YES), then the control circuit sets the change-determination flag in S550 and ends the change-determination process.

Figure 20:
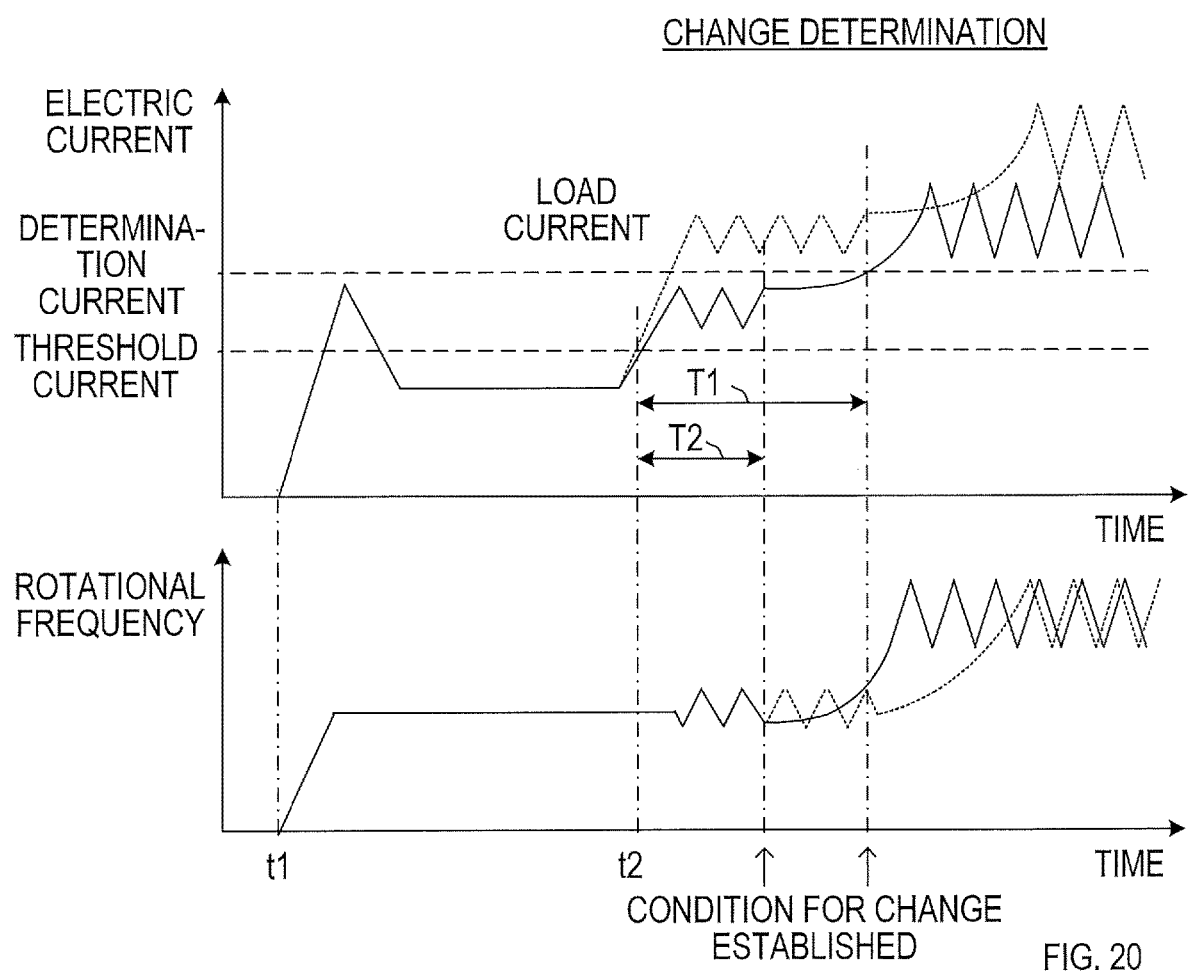
FIG. 20 is a time chart showing an operation to set a condition for change executed in the change-determination process in FIG. 19.

As a consequence, as shown in FIG. 20, in response to the detected current value being equal to or greater than the electric current threshold value after the initiation of drive of the motor 4 at the time point t1, and then in response to the duration of time thereafter (length of time after a time point t2) reaching given durations of time T1 and T2, which are set to specified values, the command rotational frequency is changed to correspond to the high speed rotation.

Thus, by executing the change-determination process as shown in FIG. 19, the control circuit 80 can determine that the condition for change is established and change the rotational state of the motor 4 from the low speed rotation to the high speed rotation when the load imposed on the motor 4 increases due to the impacts after the initiation of drive of the motor 4.

Since the condition for change is determined by the specified value that is used in S542 for the comparison with the electric current count value, if this specified value is set based on the detected current value corresponding to the load imposed on the motor 4 before the rotational state is changed, then the condition for change can be set in accordance with the load.

Accordingly, in the change-determination process shown in FIG. 19, the control circuit 80 determines in S590 whether the detected current value is equal to or greater than a determination current value, which is used for determining a large load state, after incrementing the electric current counter in S534 and before proceeding the process to S542. As shown in FIG. 20, the determination current value is greater than the electric current threshold value used in S532.

If the control circuit 80 determines in S590 that the detected current value is equal to or greater than the determination current value (S590: YES), the control circuit 80 proceeds the process to S592, sets the specified value to a preset first count value C1, and proceeds the process to S542.

If the control circuit 80 determines that the detected current value is less than the determination current value (S590: NO), then the control circuit 80 proceeds the process to S594, sets the specified value to a preset second count value C2, and proceeds the process to S542. The first count value C1 is set to be greater than the second count value C2.

In this case, as shown in FIG. 20, if the detected current value before the rotational state of the motor 4 is changed is large, then the duration of time T1, which is the time until the condition for change is established, becomes longer than the duration of time T2, which is the time until the condition for change is established when the detected current value is small. Consequently, the tightening of the fastener to the workpiece with the low speed rotation of the motor 4 can still be finished securely with a large load.

In the change-determination process shown in FIG. 19, if a negative determination is made in S510 or S520, then the control circuit 80 clears the electric current counter in S562, clears the change-determination flag in S570, and ends the change-determination process.

Fifth Modified Example

In the aforementioned embodiment and modified examples, it is explained that the change of the rotational state of the motor 4 from the low speed rotation to the high speed rotation is determined based on the number of impact and the magnitude of load (electric current). Nevertheless, this change determination need not always be executed automatically, but may be executed in accordance with a command from the user.

Figure 21:
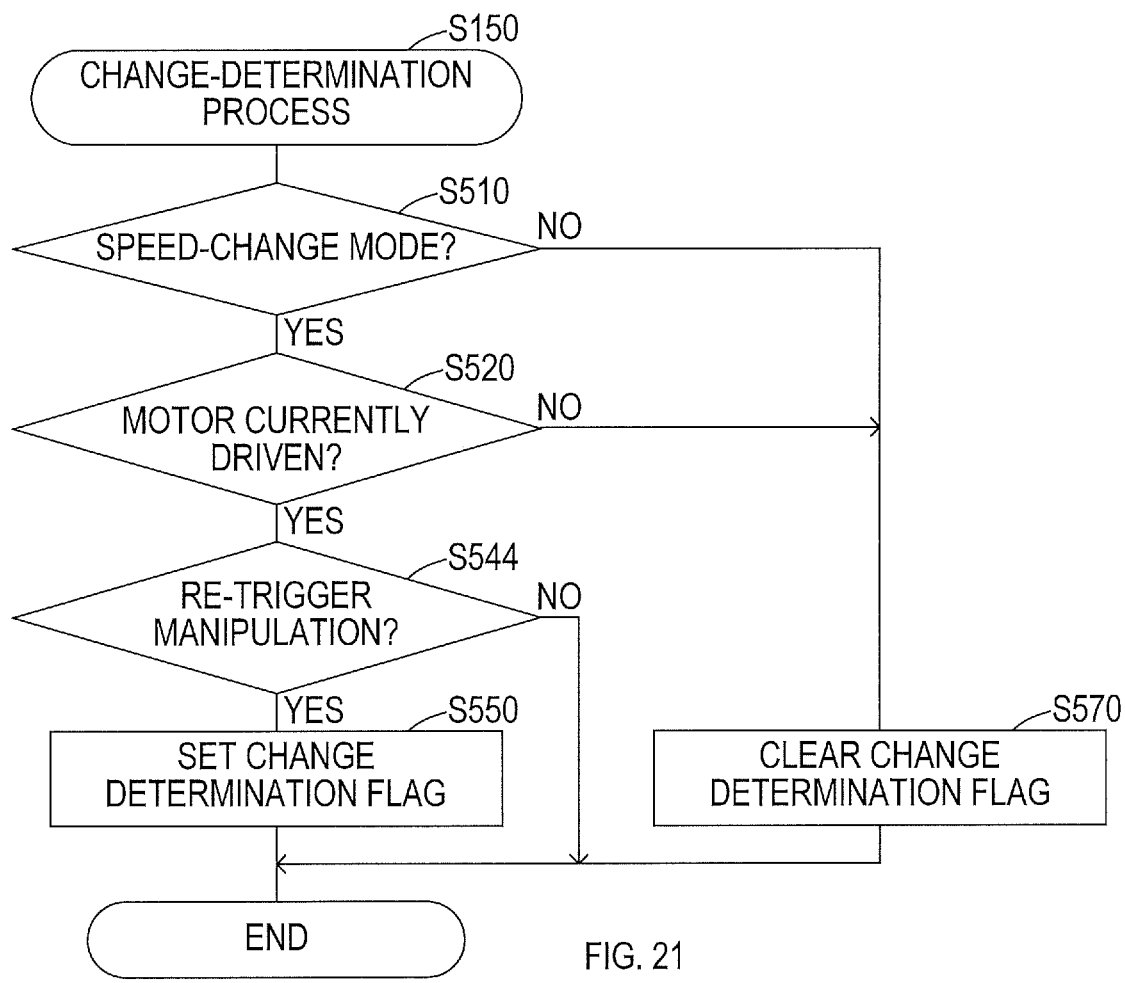
FIG. 21 is a flow chart showing a change-determination process in a fifth modified example.

For example, the change-determination process may be executed as shown in FIG. 21. If the control circuit 80 determines in S510 that the operation mode is the speed-change mode (S510: YES) and also determines in S520 that the motor 4 is being driven (S520: YES), then the control circuit 80 proceeds the process to S544.

Figure 22:
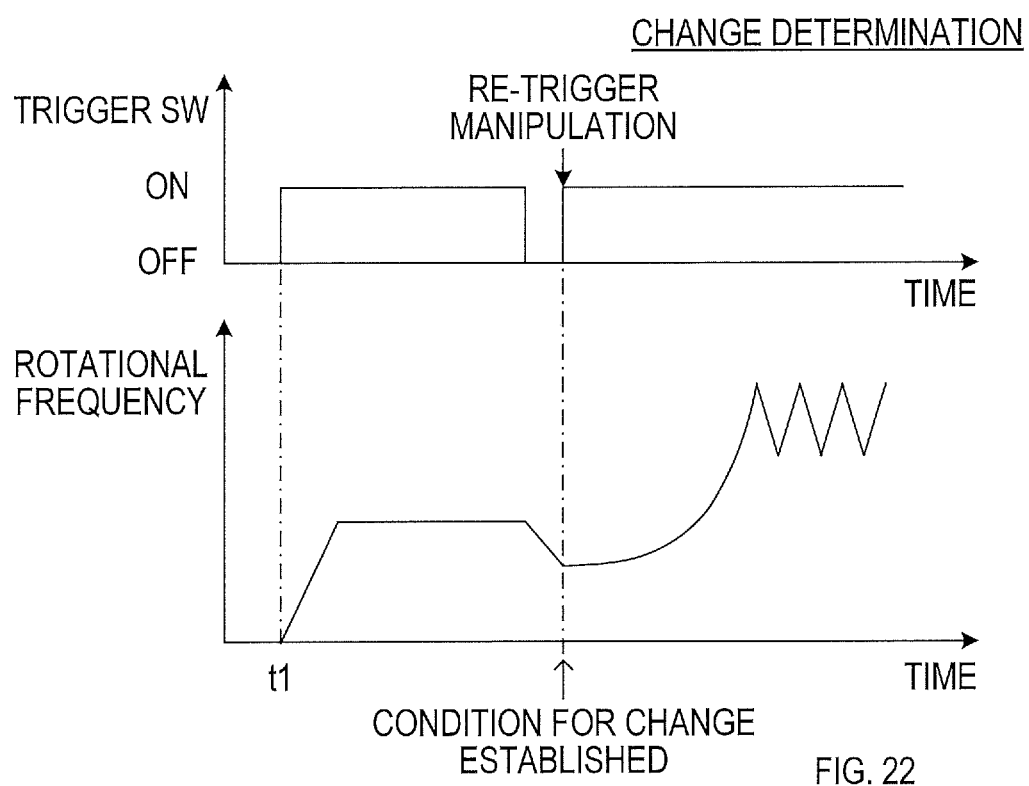
FIG. 22 is a time chart showing a condition for change set by a manipulation on a trigger in the change-determination process in FIG. 21.

In S544, as shown in FIG. 22, the control circuit 80 determines whether the trigger SW 32 is once turned to the OFF state and brought back to the ON state during a specified short period of time, in other words, whether the trigger 21 is retriggered.

If the trigger 21 is retriggered (S544: YES), the control circuit 80 proceeds the process to S550, sets the change-determination flag, and ends the change-determination process. If the trigger 21 is not retriggered (S544: NO), then the control circuit 80 immediately ends the change-determination process.

In this case, as shown in FIG. 22, the motor 4 is rotated at the low rotational speed in the low speed mode until the user retrigger the trigger 21. And, once the user retriggers the trigger 21, the drive of the motor 4 is changed to the high speed mode and the motor 4 is rotated at the high rotational speed.

According to the driver 1 configured as mentioned above, the user can change the rotational state of the motor 4 from the low speed rotation to the high speed rotation by the manipulation on the trigger 21. Thus, if such a control can be selected as one of the control patterns of the motor 4 in the aforementioned embodiment, then the driver 1 can be further improved in the usability.

In the change-determination process shown in FIG. 21, if the negative determination is made in S510 or S520, then the control circuit 80 clears the change-determination flag in S570 and ends the change-determination process.

Sixth Modified Example

In the aforementioned embodiment, it is explained that, in the mode-setting process in S140, the operation mode of the driver 1 is changed to the speed-change mode or to the normal mode in accordance with the manipulation on the mode change SW 36.

In this case, the user needs to manipulate the mode change SW 36, which may complicate the change of the operation mode when the user is engaged in a work with his/her fingers fixed on the trigger 21.

Figure 24:
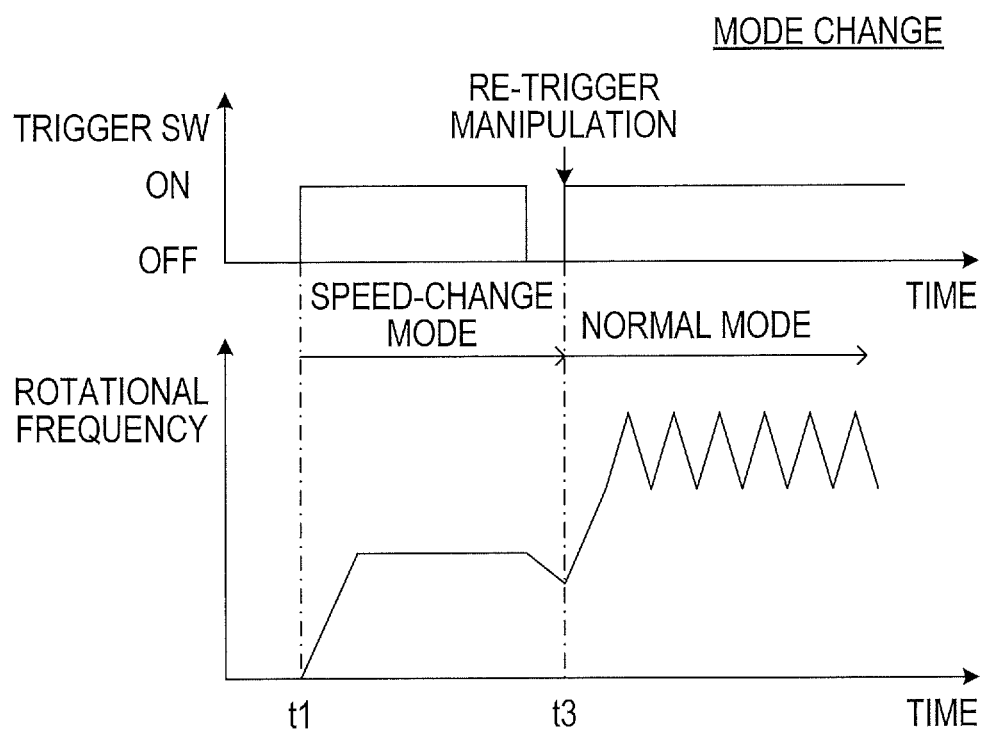
FIG. 24 is a time chart showing an operation to change between a speed-change mode and a normal mode executed in the mode setting process in FIG. 23.

The present modified example provides a solution as shown in FIG. 24. Specifically, the operation mode of the driver 1 is set to the speed-change mode at the time of initiation of drive of the motor 4 (time point t1) to drive the motor 4 at the low rotational speed, and once the trigger 21 is retriggered (time point t3), the operation mode is changed to the normal mode.

Figure 23:
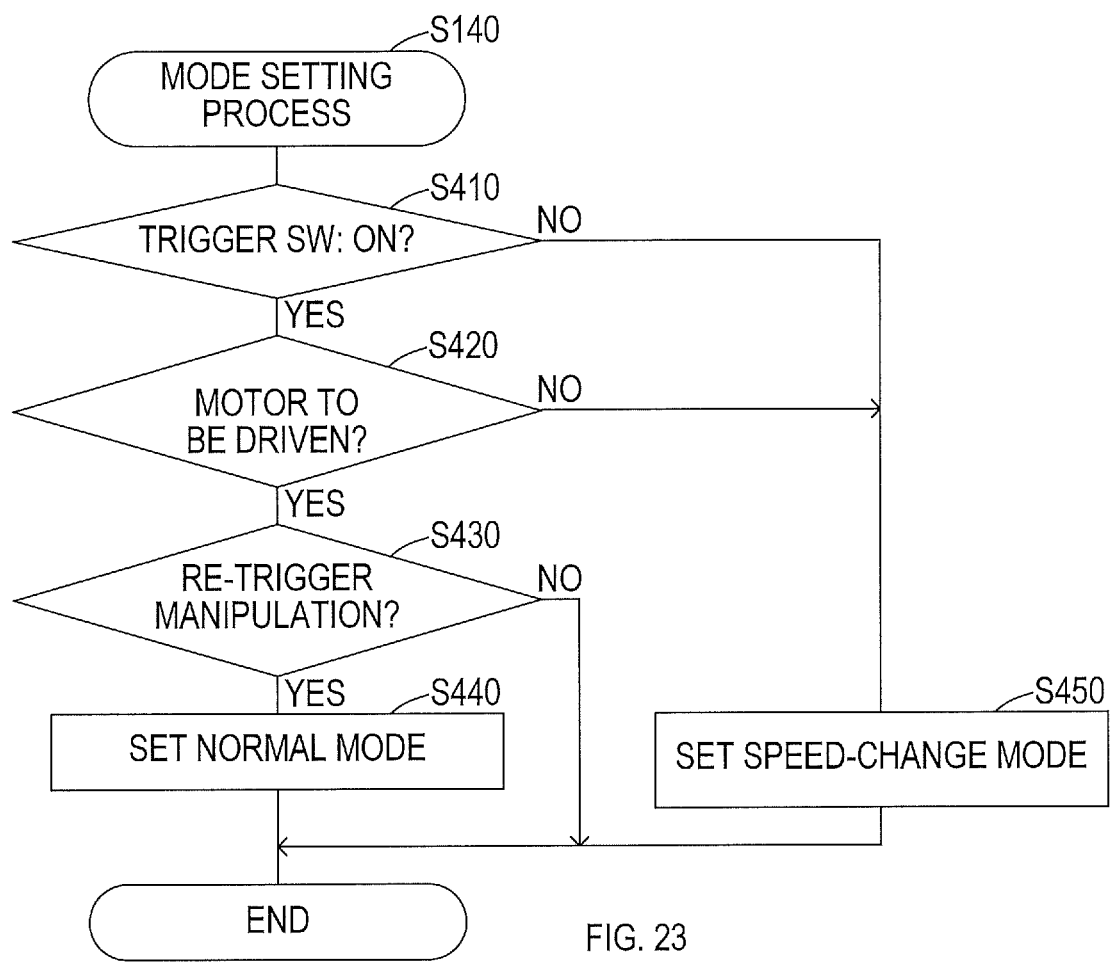
FIG. 23 is a flow chart showing a mode setting process in a sixth modified example.

As shown in FIG. 23, in the mode-setting process in the present modified example, the control circuit 80 first determines in S410 whether the trigger SW 32 is placed in the ON state. If the trigger SW 32 is placed in the ON state (S410: YES), then the control circuit 80 proceeds the process to S420 and determines whether the motor 4 should be driven based on the amount of manipulation on the trigger 21 that is detected by the manipulation amount detector 34.

If the control circuit 80 determines that the motor 4 should not be driven (S420: NO) or determines in S410 that the trigger 21 is placed in the OFF state (S410: NO), then the control circuit 80 proceeds the process to S450, sets the operation mode to the speed-change mode, and ends the mode-setting process. In S450, the control circuit 80 changes the control pattern in the speed-change mode in accordance with the manipulation on the impact force change SW 38.

If the control circuit 80 determines in S420 that the motor 4 should be driven (S420: YES), then the control circuit 80 proceeds the process to S440 and determines whether the trigger 21 is retriggered. As mentioned above, the determination of the retriggering manipulation is based on the determination of whether the trigger SW 32 is once turned to the OFF state and brought back to the ON state during the specified short period of time.

If the trigger 21 is retriggered (S430: YES), then the control circuit 80 proceeds the process to S440, changes the operation mode of the driver 1 from the speed-change mode to the normal mode, and ends the mode-setting process. If the trigger 21 is not retriggered (S430: NO), then the control circuit 80 immediately ends the mode-setting process.

If the operation mode of the driver 1 can be changed by the retriggering manipulation on the trigger 21 as mentioned above, then the user can change the operation mode without manipulating the mode change SW 36. This improves the usability of the driver 1.

Seventh Modified Example

In the aforementioned sixth modified example, it is explained that when the drive of the motor 4 is initiated by the manipulation on the trigger 21, the operation mode of the driver 1 is set to the speed-change mode. And, in response to the retriggering manipulation on the trigger 21, the operation mode is changed to the normal mode.

However, such changes of the operation mode may be executed in accordance with the amount of manipulation on the trigger 21.

Figure 25:
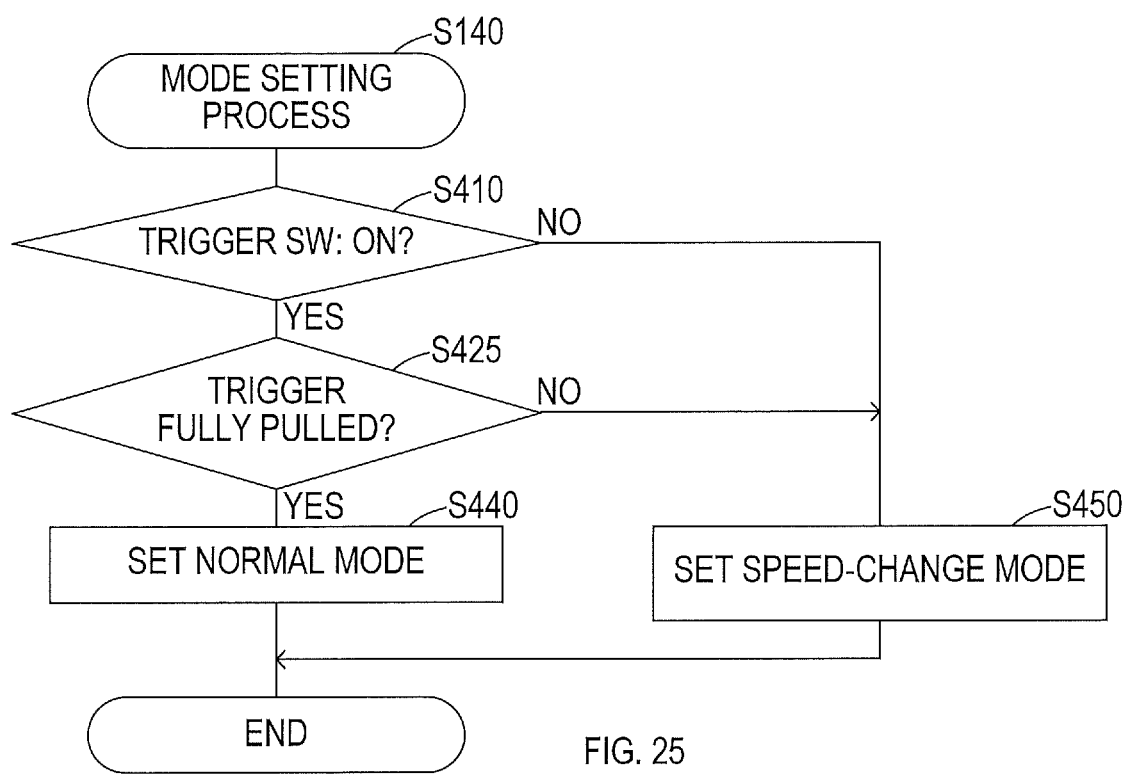
FIG. 25 is a flow chart showing a mode setting process in a seventh modified example.

For example, the mode-setting process may be executed as shown in FIG. 25. Specifically, if the control circuit 80 determines in S410 that the trigger SW 32 is placed in the ON state (S410: YES), then the control circuit 80 proceeds the process to S425 and determines whether the trigger 21 is completely pulled to the maximum extent.

Alternatively, the trigger 21 may be additionally provided with a switch that is placed in the ON state if the amount of manipulation on the trigger 21 is equal to or greater than a specified amount, and the aforementioned determination may be made based on an input from this switch.

If the control circuit 80 determines in S425 that the trigger 21 is completely pulled to the maximum extent (S425: YES), then the control circuit 80 proceeds the process to S440, sets the operation mode of the driver 1 to the normal mode, and ends the mode-setting process.

If a negative determination is made in S410 or S425, then the control circuit 80 proceeds the process to S450, sets the operation mode of the driver 1 to the speed-change mode, and ends the mode-setting process.

Figure 26:
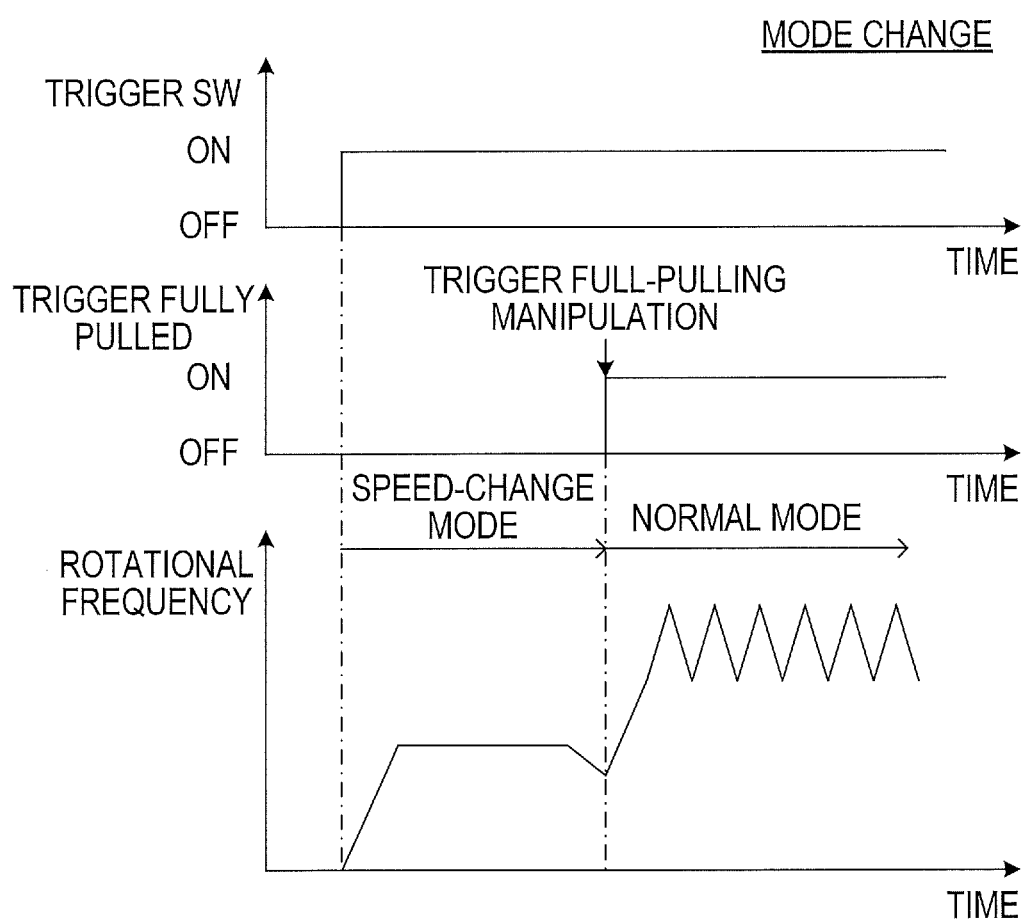
FIG. 26 is a time chart showing an operation to change between a speed-change mode and a normal mode executed in the mode setting process in FIG. 25.

According to the driver 1 configured as mentioned above, the user can set the operation mode to the speed-change mode or the normal mode in accordance with the amount of manipulation (pulled amount) of the trigger 21 as shown in FIG. 26. This accordingly improves the usability of the driver 1.

Other Modified Examples

In the aforementioned embodiment, it is explained that the control pattern of the motor 4 in the speed-change mode is sequentially changeable to any one of the control patterns by the user's manipulation (pressing manipulation) on the impact force change SW 38.

However, the control pattern may also be selected, for example, by using a dial switch or two or more switches. Alternatively, the control pattern may also be selected by transmitting a command to select the control pattern to the wireless dongle 60 through manipulation on an external device such as a smartphone.

Moreover, the electric working machine in the present disclosure is not limited to a rechargeable impact driver such as the driver 1 and may be, for example, a rotary impact tool, such as an impact wrench, that includes an impact mechanism driven by a motor, or any other electric working machines that includes no impact mechanisms.

The technique in the present disclosure may be applied to any electric working machine, similarly to the aforementioned embodiment, that is configured to change the rotational state of a motor from a low speed rotation to a high speed rotation in response to an establishment of a specified condition for change, such as an increase in a load after the initiation of the drive of the motor, and an effect similar to the aforementioned embodiment can be obtained.

In the aforementioned embodiment, the motor 4 is not limited to the three-phase brushless motor. The motor 4 may also be implemented with any motor that can rotatably drive the output shaft of the electric working machine. The electric working machine in the present disclosure is not limited to the battery-driven electric working machine as described in the aforementioned embodiment. The present disclosure may be applied to any electric working machine that receives an electric power through a cord, or to any electric working machine that is configured to rotatably drive a tool element by an alternating-current motor.

In addition, two or more functions of one element in the aforementioned embodiment may be achieved by two or more elements; or one function of one element in the aforementioned embodiment may be achieved by two or more elements. Likewise, two or more functions of two or more elements may be achieved by one element; or one function achieved by two or more elements may be achieved by one element. A part of the configuration of the aforementioned embodiment may be omitted; and at least a part of the configuration of the aforementioned embodiment may be added to or replaced with another part of the configuration of the aforementioned embodiment. It should be noted that any and all modes that are encompassed in the technical ideas that are defined only by the languages in the claims are embodiments of the present disclosure.

What is claimed is:

1. An electric working machine comprising:
   a motor;
   a spindle configured to be rotated by the motor;
   a hammer arranged around the spindle;
   a coil spring configured to bias the hammer towards a front of the electric working machine;
   an anvil configured to be rotatably supported in a front side of the hammer and to receive an impact by the hammer;
   a trigger switch configured to be manipulated by a user of the electric working machine to manipulate rotational state of the motor;
   an electric current detection circuit connected to the motor and configured to detect a detected current value, the detected current value corresponding to a magnitude of current supplied to the motor; and
   a control circuit configured to:
      initiate the motor at a preset low speed rotation in response to a manipulation on the trigger switch,
      increment an electric current counter in response to the detected current value being equal to or greater than an electric current threshold value,
      decrement the electric current counter in response to the detected current value being less than the electric current threshold value,
      change a rotational state of the motor, in response to a value of the electric current counter exceeding a specified value after the motor is initiated, from the low speed rotation to a high speed rotation,
      set the specified value to a first count value in response to the detected current value being equal to or greater than a determination current value, the determination current value being greater than the electric current threshold value, and
      set the specified value to a second count value in response to the detected current value being less than the determination current value, the first count value being greater than the second count value.

2. An electric working machine comprising:
   a motor;
   an electric current detection circuit connected to the motor and configured to detect a detected current value, the detected current value corresponding to a magnitude of current supplied to the motor; and
   a controller configured to:
      initiate the motor at a preset low speed rotation,
      increment an electric current counter in response to the detected current value being equal to or greater than an electric current threshold value,
      decrement the electric current counter in response to the detected current value being less than the electric current threshold value,
      change a rotational state of the motor, in response to a value of the electric current counter exceeding a specified value after the motor is initiated, from the low speed rotation to a high speed rotation,
      set the specified value to a first count value in response to the detected current value being equal to or greater than a determination current value, the determination current value being greater than the electric current threshold value, and
      set the specified value to a second count value in response to the detected current value being less than the determination current value, the first count value being greater than the second count value.

3. The electric working machine according to claim 2, further comprising:
   an impact mechanism; and
   an impact detector configured to detect an impact by the impact mechanism.

4. A method of controlling a rotational state of a motor of an electric working machine, the method comprising:
   initiating the motor at a preset low speed rotation;
   detecting a detected current value corresponding to a magnitude of current supplied to the motor;
   incrementing an electric current counter in response to the detected current value being equal to or greater than an electric current threshold value;
   decrementing the electric current counter in response to the detected current value being less than the electric current threshold value;
   changing the rotational state of the motor from the low speed rotation to a high speed rotation in response to a value of the electric current counter exceeding a specified value after the motor is initiated;

setting the specified value to a first count value in response to the detected current value being equal to or greater than a determination current value, the determination current value being greater than the electric current threshold value; and setting the specified value to a second count value in response to the detected current value being less than the determination current value, the first count value being greater than the second count value.

5. An electric working machine comprising:

a motor; and a controller programmed to perform:
- a first function that initiates the motor at a preset low speed rotation,
- a second function that determines a magnitude of a load imposed on the motor in the low speed rotation,
- a third function that sets, based on the magnitude of the load determined, a control variable of the motor in a high speed rotation and/or a condition for change, and
- a fourth function that changes a rotational state of the motor, in response to an establishment of the condition for change after the motor is initiated, from the low speed rotation to the high speed rotation.

6. The electric working machine according to claim 5, wherein the third function sets a target value of the control variable.

7. The electric working machine according to claim 6, wherein the third function sets the target value such that the target value increases in response to the magnitude of the load being greater than a preset load threshold value.

8. The electric working machine according to claim 5, wherein
the third function sets a conduction parameter of the motor as the control variable, and
the conduction parameter corresponds to a magnitude of current supplied to the motor.

9. The electric working machine according to claim 8, wherein the third function sets the conduction parameter such that the conduction parameter increases in response to the magnitude of the load being greater than a preset load threshold value.

10. The electric working machine according to claim 8, wherein the conduction parameter corresponds to a duty ratio for a pulse width modulation control of the magnitude of the current.

11. The electric working machine according to claim 5, further comprising:

an impact mechanism; and an impact detector configured to detect an impact by the impact mechanism.

12. The electric working machine according to claim 11, wherein the condition for change is established in response to a number of the impact detected by the impact detector reaching a given number in the low speed rotation.

13. The electric working machine according to claim 12, wherein the third function sets the given number in accordance with the magnitude of the load determined.

14. The electric working machine according to claim 13, wherein the third function sets the given number such that the given number increases in response to the magnitude of the load being greater than a preset load threshold value.

15. The electric working machine according to claim 5, wherein
the controller is further programmed to perform a fifth function that accumulates a length of time when a magnitude of conduction current to the motor in the low speed rotation is equal to or greater than a preset electric current threshold value, and
the condition for change is established in response to the accumulated length of time reaching a given length of time.

16. The electric working machine according to claim 15, wherein the third function sets the given length of time in accordance with the magnitude of the load determined.

17. The electric working machine according to claim 16, wherein the third function sets the given length of time such that the given length of time increases in response to the magnitude of the load being greater than a preset load threshold value.

* * * * *